(12) United States Patent
Bugay et al.

(10) Patent No.: US 10,867,256 B2
(45) Date of Patent: *Dec. 15, 2020

(54) METHOD AND SYSTEM TO PROVIDE RELATED DATA

(71) Applicant: Knoema Corporation, McLean, VA (US)

(72) Inventors: Vladimir Bugay, Perm (RU); Anton Firsov, Perm (RU); Vitalii Sytin, Perm (RU); Vladimir Eskin, McLean, VA (US)

(73) Assignee: Knoema Corporation, McLean, VA (US)

(*) Notice: Subject to any disclaimer, the term of this patent is extended or adjusted under 35 U.S.C. 154(b) by 902 days.

This patent is subject to a terminal disclaimer.

(21) Appl. No.: 15/483,118

(22) Filed: Apr. 10, 2017

(65) Prior Publication Data

US 2017/0213157 A1 Jul. 27, 2017

Related U.S. Application Data

(63) Continuation-in-part of application No. 14/802,678, filed on Jul. 17, 2015, now Pat. No. 10,108,907.

(51) Int. Cl.
*G06N 20/00* (2019.01)
*G06F 3/0484* (2013.01)
(Continued)

(52) U.S. Cl.
CPC ........... *G06N 20/00* (2019.01); *G06F 3/0484* (2013.01); *G06F 16/338* (2019.01);
(Continued)

(58) Field of Classification Search
CPC ...... G06N 99/005; G06N 5/022; G06N 5/025; G06N 5/003; G06N 5/02; G06N 20/00;
(Continued)

(56) References Cited

U.S. PATENT DOCUMENTS 6,356,922 B1 * 3/2002 Schilit ................. G06F 16/30
715/236
8,032,822 B1 * 10/2011 Artamonov .......... G06Q 40/123
704/9

(Continued)

OTHER PUBLICATIONS

"U.S. Appl. No. 14/802,678, Notice of Allowance dated Jun. 22, 2018", 15 pgs.

(Continued)

*Primary Examiner* — Dave Misir
(74) *Attorney, Agent, or Firm* — Schwegman Lundberg & Woessner, P.A.

(57) ABSTRACT

Various embodiments described herein provide for methods and systems of providing related information from a data source. For example, a method may include responding to a natural language query with a natural language response that includes and describes data related to the natural language query. The related data may correspond to the numerical data or text discovered from various data sources. Further, a database trained with a machine-learning algorithm may be utilized to identify time series related data that is associated with the natural language query and that is used within the generated natural language response. The methods and systems described herein may be utilized by a message bot when responding to questions posed by an online user during a chat session.

22 Claims, 28 Drawing Sheets

(51) Int. Cl.
*G06F 16/332* (2019.01)
*G06F 16/33* (2019.01)
*G06F 16/338* (2019.01)
*G06N 5/02* (2006.01)
*G06F 40/18* (2020.01)
*G06F 40/30* (2020.01)
*G06F 40/169* (2020.01)
*G06F 40/247* (2020.01)
*G06F 40/295* (2020.01)

(52) U.S. Cl.
CPC ...... *G06F 16/3329* (2019.01); *G06F 16/3334* (2019.01); *G06F 40/169* (2020.01); *G06F 40/18* (2020.01); *G06F 40/247* (2020.01); *G06F 40/295* (2020.01); *G06F 40/30* (2020.01); *G06N 5/022* (2013.01)

(58) Field of Classification Search
CPC .... G06F 3/0484; G06F 17/241; G06F 17/246; G06F 17/278; G06F 17/2705; G06F 17/2785; G06F 17/2795; G06F 17/30696; G06F 17/30654; G06F 17/30663; G06F 16/3334; G06F 16/3329; G06F 16/338; G06F 40/247; G06F 40/169; G06F 40/295; G06F 40/30; G06F 40/18
USPC .......................................................... 706/11
See application file for complete search history.

(56) References Cited

U.S. PATENT DOCUMENTS

| | | | |
|---|---|---|---|
| 10,108,907 B2 | 10/2018 | Bugay et al. | |
| 2002/0026306 A1* | 2/2002 | Bangalore | G06F 40/56 704/9 |
| 2007/0204319 A1* | 8/2007 | Ahmad | H04N 21/4622 725/134 |
| 2008/0172362 A1* | 7/2008 | Shacham | G06F 16/951 |
| 2008/0263019 A1* | 10/2008 | Harrison | G06F 16/3334 |
| 2010/0005081 A1* | 1/2010 | Bennett | G10L 15/30 704/9 |
| 2010/0145902 A1* | 6/2010 | Boyan | G06F 16/958 706/54 |
| 2013/0332450 A1* | 12/2013 | Castelli | G06F 16/36 707/722 |
| 2014/0195884 A1* | 7/2014 | Castelli | G06F 16/285 715/201 |
| 2016/0170814 A1* | 6/2016 | Li | G06F 9/542 719/318 |
| 2016/0350280 A1* | 12/2016 | Lavallee | G06F 40/284 |
| 2017/0017897 A1 | 1/2017 | Bugay et al. | |

OTHER PUBLICATIONS

"U.S. Appl. No. 14/802,678, Non Final Office Action dated Jan. 16, 2018", 19 pgs.
"U.S. Appl. No. 14/802,678, Response filed Apr. 13, 2018 to Non-Final Office Action dated Jan. 16, 2018", 16 pgs.

* cited by examiner

__US 10,867,256 B2__

METHOD AND SYSTEM TO PROVIDE RELATED DATA

CROSS-REFERENCE TO RELATED APPLICATIONS

This application is a continuation-in-part of, and claims the benefit of U.S. application Ser. No. 14/802,678, filed Jul. 17, 2015, under 35 USC §120, which is incorporated in its entirety by this reference.

TECHNICAL FIELD

The subject matter disclosed herein generally relates to machines that are configured to process data. More particularly, the present disclosure describes systems and methods to identify data related to a source document.

BACKGROUND

Documents such as news articles may provide information related to a given subject matter. For example, a news article on China may describe economic data related to the Chinese economy. However, a reader of the article is limited to the information available in the article. Further, factual information (e.g., Gross Domestic Product or GDP) may appear at various places (e.g., in different paragraphs) throughout the article.

With the advent of the Internet, vast repositories of public and open data, national and regional statistics are available. For example, Knoema Corporation has built a repository of public and open data enhanced by generic crowd-sourced data collection platform integrated with data and visualization tools. The platform operates in conjunction with a network of data collectors as part of a global initiative for collecting and aggregating data on various topics on a worldwide scale. Likewise, companies like Google provide access to a vast body of data including articles and other text documents on a multitude of topics.

BRIEF DESCRIPTION OF THE DRAWINGS

The present disclosure illustrates various embodiments by way of example and not limitation in the figures of the accompanying drawings. In the drawings, like references indicate similar elements and in which.

DETAILED DESCRIPTION

Figure 1:
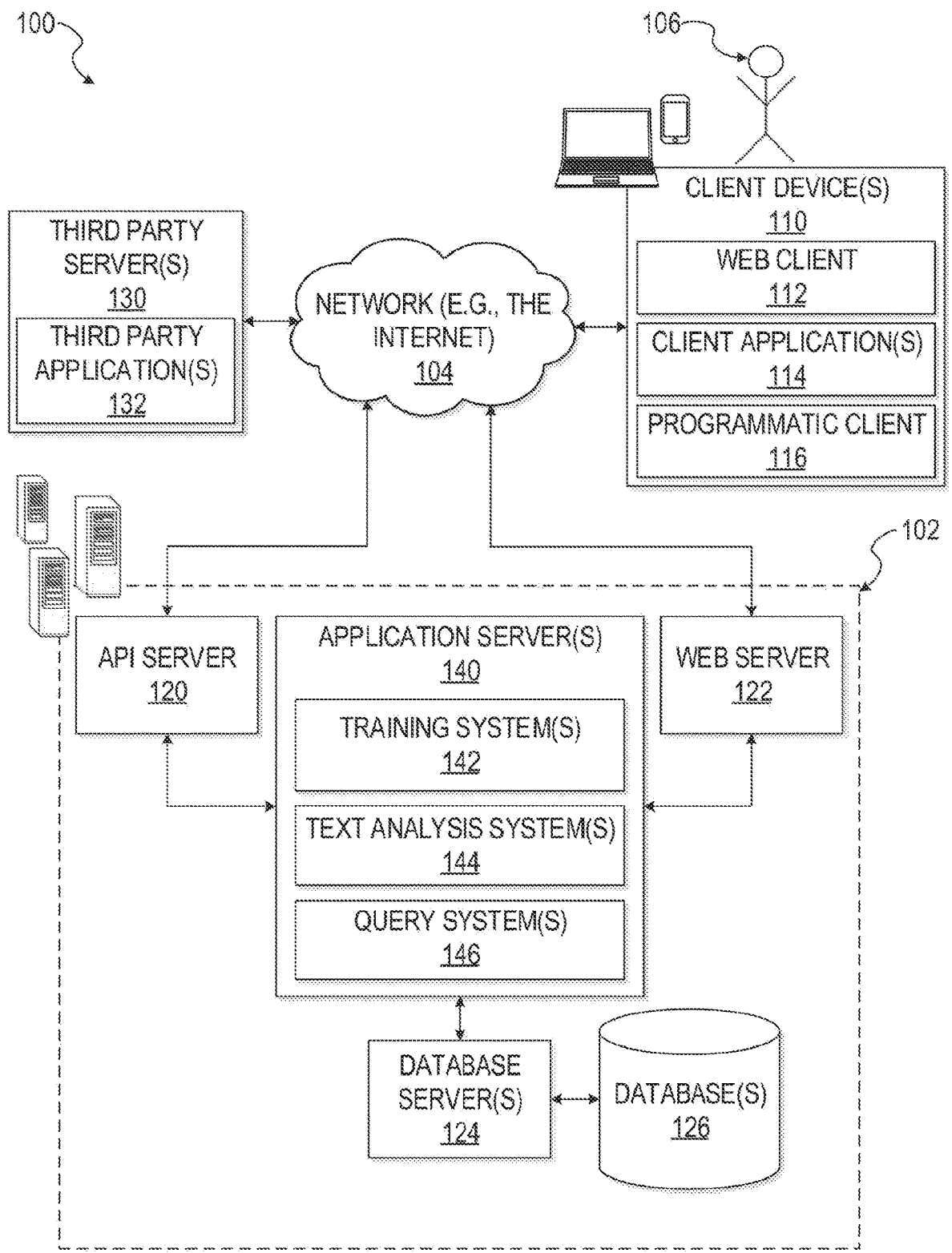
FIG. 1 is a high-level client-server-based network architecture, in accordance with an example embodiment, configured to identify data related to a source document.

In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Example methods and systems described herein are directed to systems and methods to provide data (e.g., information, related facts or claims, or the like) related to a source document to a user. The data may be presented as text (including numerical data) and/or graphically (e.g., bar charts, line charts etc.). In an example embodiment, data related to a source document (e.g., an article published on the Internet) is provided to the reader on-the-fly. For example, if a user is reading an article on his or her favorite sports team, and hence the source document relates to sports, facts and other sports related information may be presented to the user in an automated fashion. Likewise, if the user is a member of a sales team entering sales related data into a spreadsheet, and hence the source document relates to sales, facts and other sales related information may be presented to the use in an automated fashion. It should be noted that the methods and systems described herein apply to any source documents that include any content on any subject matter. The terms "fact" and "claim" are used interchangeably in this document. Thus, the methods and systems described herein may, in some example embodiments, apply to assertions that are known to be true (e.g., facts) as well as assertions that may not necessarily be true (e.g., claims).

In an example embodiment, the related data may be facts or claims (e.g., attributed numeric values) and, accordingly, the source document may be an arbitrary formatted text or webpage. For example, when the source document includes numerical data (e.g., GDP, population growth, sales figures, or any other numerical values), the methods and systems described herein may identify this numerical data and provide a unified view of this numerical data in an associated display zone as described. Accordingly, for example, facts or claims in an article may be identified in various different paragraphs in a document and these s, together with their associated labels (e.g., GDP), may be displayed in a related data display zone. In additional to the example "discovered claims" identified in the article, time series data related to the source document may be obtained from a data repository and displayed to the user (e.g., in the form of one or more graphs).

Generally, the input text from the source document may be converted to raw text without any markup. Thereafter, the raw text may be parsed into sentences using a sentence detection algorithm, and the sentences may then be converted into syntax tree. The syntax tree may represent an underlying sentence as a tree of words tagged with their respective part of speech (POS) tags and relationships between words and parts of sentences. Thereafter, a machine learning (ML) model may be applied to produce related discovered data (e.g., facts, claims and/or attributed numerical data) found in the text and data related to the text from a data repository. In an example embodiment, provision of the related data is done automatically on the fly without any user intervention.

Referring to FIG. 1, an example embodiment of a high-level client-server-based network architecture 100, in accordance with an example embodiment, configured to identify data related to a source document is shown. The architecture 100 is shown to include a networked system 102 that implements at least some of the methods and systems described herein to provide data (e.g., information, related facts, or the like) to a user.

The networked system 102, in the example form of a network-based related data system, provides server-side functionality via a network 104 (e.g., the Internet or wide area network (WAN)) to users 106 each associated with one or more client devices 110. The client device 110 is shown by way of example to include a web client 112 (e.g., a browser, such as the Internet Explorer® browser developed by Microsoft® Corporation of Redmond, Wash. State), one or more client applications 114, and a programmatic client 116 executing on the client device 110.

The networked system 102 is further shown to include an application program interface (API) server 120, a web server 122, a database server 124 coupled to one or more databases 126, and one or more application servers 140. The application server 140 is shown to include one or more training system(s) 142, text analysis system(s) 144, and query system(s) 146. The query system(s) 146 interface with the database server(s) 124 to access data in the database(s) 126. In an example embodiment, the database(s) 126 include data (e.g., data as provided by Knoema Corporation) on countries throughout (.t the world (e.g., data available from many (e.g., hundreds) of databases). The networked system 102 is also shown to include third party server(s) 130 and third party applications 132.

The client device 110 may comprise, but is not limited to, a mobile phone, desktop computer, laptop, portable digital assistant (PDAs), smart phone, tablet, ultra book, netbook, laptop, multi-processor system, microprocessor-based or programmable consumer electronic, or any other communication device that a user may utilize to access the networked system 102. The client device 110 may comprise a display module to display information (e.g., in the form of user interfaces).

The client applications 114 may include a web browser, messaging application, electronic mail (email) application, and the like. Further, the client device 110 may include a related data application, in accordance with an example embodiment, that provides data or any other information related to a source document. It will be appreciated that the source document can be provided by another application. For example, when the user 106 is reading a news article in a browser on the client device 110, the related data application may interface with the browser application. Likewise, when the user 106 reads an email, the related data application may interface with the email application, and so on.

In some example embodiments, if the related data application is included in the client device 110 (e.g., as one of the client applications), then this client-side application may be configured to locally provide the user interface and at least some of the functionality described herein. The related data application may, however, be configured to communicate with the networked system 102, on an as needed basis, for data and/or processing capabilities not locally available (e.g., access to a knowledge database of related data). Conversely, if the related data application is not included in the client device 110, the client device 110 may use its web browser to access the networked system.

While the client-server-based network architecture 100 shown in FIG. 1 employs a client-server architecture, the present disclosure is of course not limited to such an architecture, and could equally well find application in a distributed, peer-to-peer, architecture system, or any other networked environment. Further, in example embodiments, the client-server-based network architecture 100 may be deployed using a virtual private cloud including frontend sever(s), backend server(s), and database server(s) in the cloud.

As mentioned above, example methods and systems described herein are directed to systems and methods to provide related data (e.g., information, related facts, or the like) to a user based on a source document (e.g., an article the user is reading on an associated electronic device).

Figure 2:
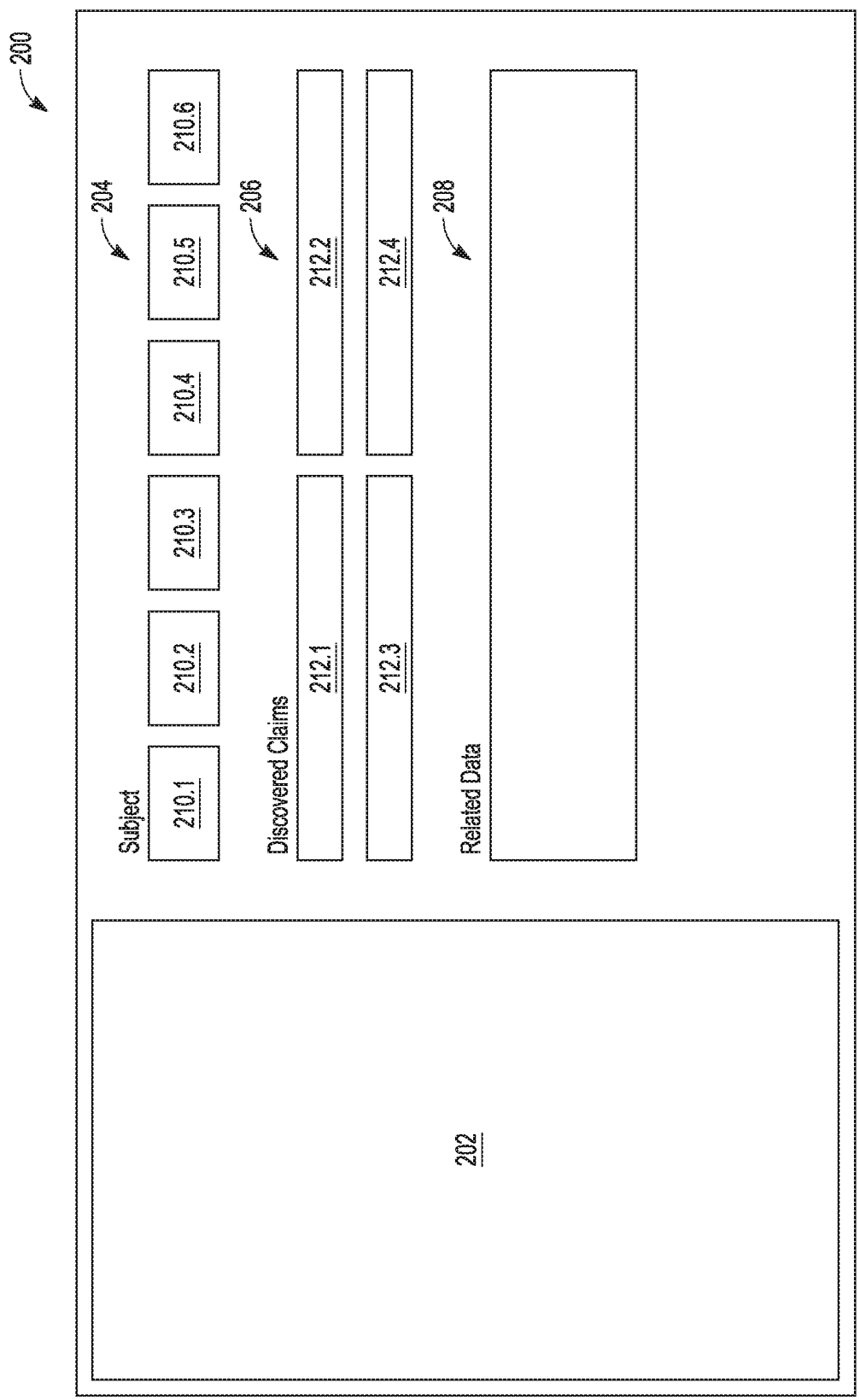
FIG. 2 shows a Graphical User Interface (GUI) to provide data related to a source document.

FIG. 2 shows a GUI 200 to provide data related to a source document. The GUI 200 is shown to include a document zone 202, a subject display zone 204, a discovered claims display zone 206, and a related data display zone 208. It should be noted that further or different display zones may be included in different example embodiments. The document zone 202 provides a text area in which a user may enter text. In another example embodiment, the document zone 202 allows a user to cut and paste text into the document zone 202 so that the text may be analyzed by the system and related data corresponding to the text may be obtained and displayed in the subject display zone 204, the discovered claims (or facts) display zone 206, and the related data display zone 208. For example, the document zone 202 may include an article that a user is reading and, in an automated fashion, the systems and methods described herein may analyze the article being read by the user and generate related facts corresponding to the article. The subject display zone 204 is shown to include identified topic identifiers 210.1-210.6, and the discovered claims display zone is shown to include discovered claims 212.1-212.4 that have been identified in the source document.

Figure 3:
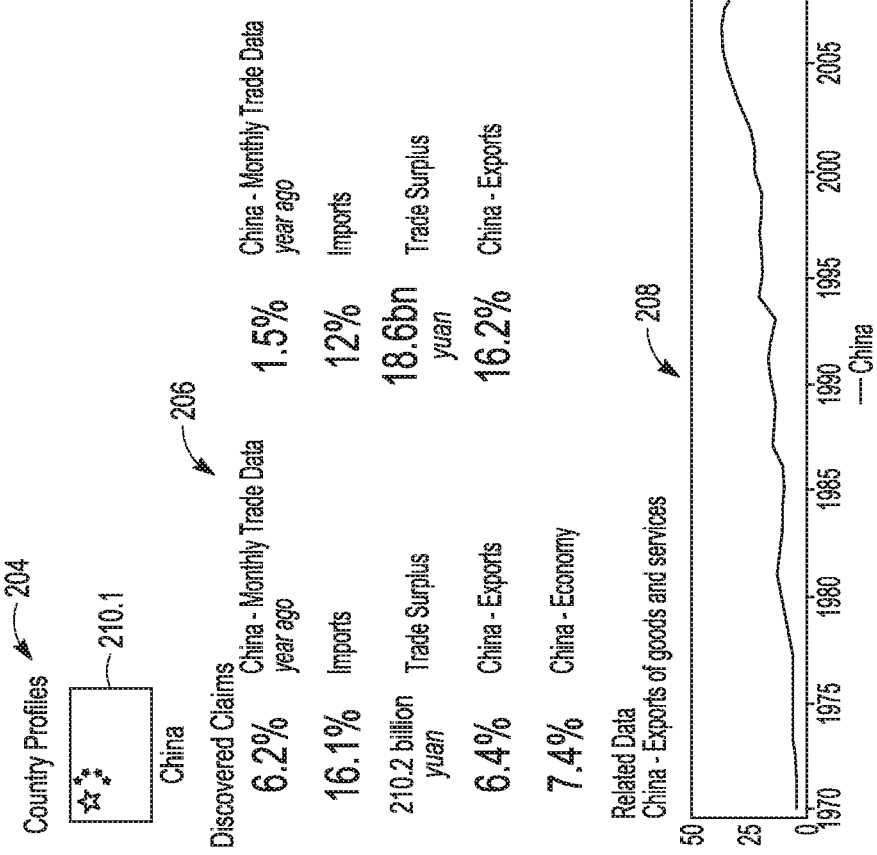
FIG. 3 shows a further example of the GUI of FIG. 2 including example source text and displaying data related to the source text.

FIG. 3 shows a further example of the GUI 200 including example source text and display data related to the source text. For example, the document zone shows text relating to financial data in China. In an automated fashion, without human intervention, the systems and methods described herein may parse or analyze the text in the document zone 202 and identify related data. In the example embodiment shown, the document in zone 202 is an article on China and, hence, the subject display zone 204 is shown to include China (see topic 210.1) and the discovered claims display zone 206 is shown to include monthly trade data, imports, trade surplus, exports, and so on. It will be noted that in this example, the discovered claims have been extracted from the article in the document zone 202. The related data display zone 208 is shown to include a graph of exports of goods and services of China. In order to obtain this related data, it will be appreciated that machine learning technology may be utilized and various different databases may be accessed to identify data related to the content provided in the display zone 204 Thus, in an example embodiment, the related data is not obtained merely by conventional searching but rather by using machine leaning technology. Further, the data in the document zone 202 may be provided by an article that a user is reading, be cut and pasted from another document into the GUI 200, and so on.

Figure 4:
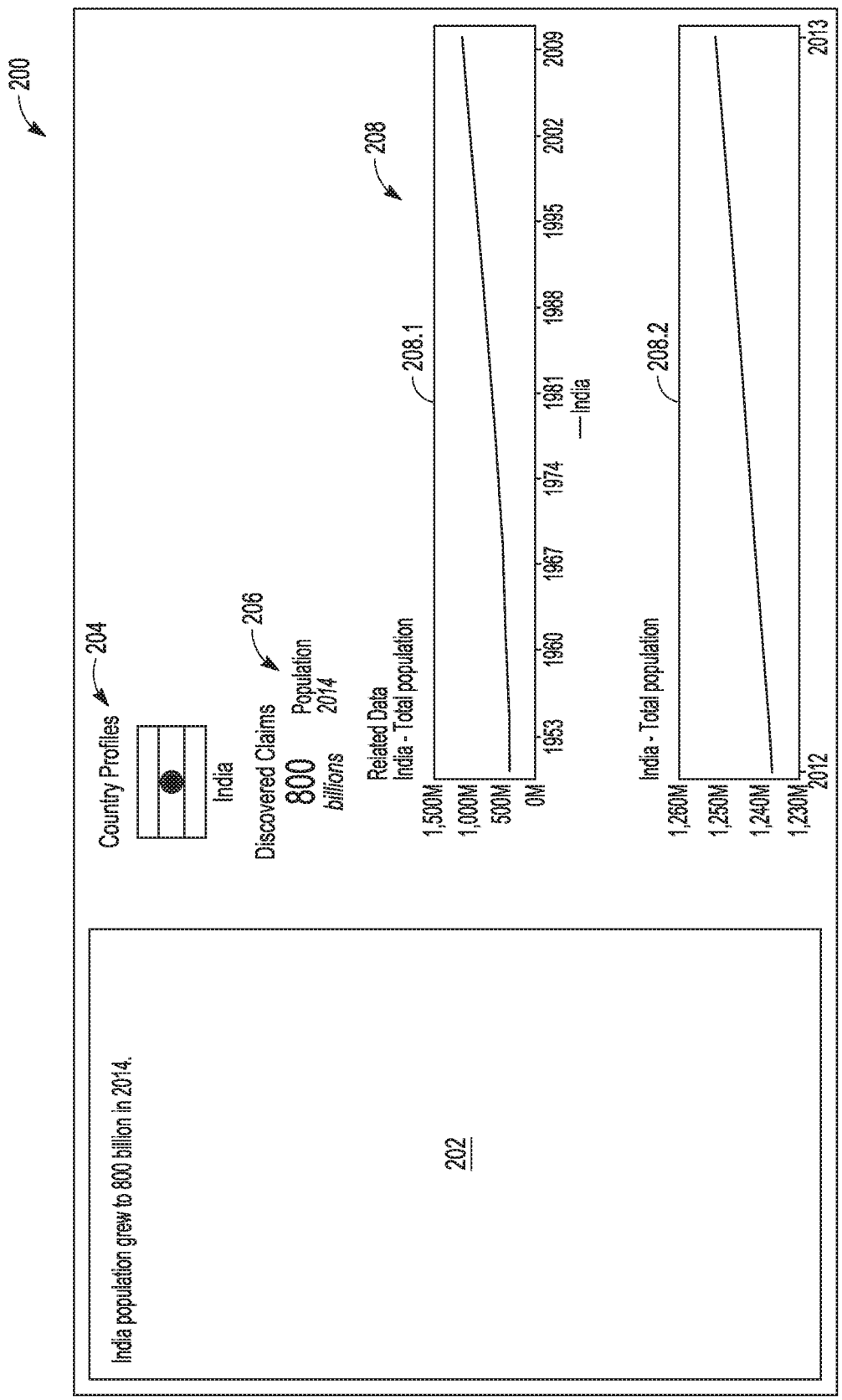
FIG. 4 shows a yet further example of the GUI of FIG. 2 including example source text and displaying data related to the source text.

FIG. 4 shows a yet further example of the GUI 200 of FIG. 2 including different example source text and displaying data related to the source text. In particular, as a user enters or types text into the document zone 202 (e.g. "India population grew to 800 billion in 2014."), the system and methods described herein automatically identify a subject matter of the text entered and identify India as a country profile as shown in the subject display zone 204. In an example embodiment, entering a "." or period triggers the automated identification process. Further, the system and methods described herein automatically identify related data in the form of discovered claims or facts (e.g. show the population to be 800 billion people) that is displayed in the discovered claims display zone 206. If, however, a user incorrectly entered the data in the document zone 202, for example, identifying the population as 600 billion, then the correct claims or facts may then be provided in the related data display zone 208 Accordingly, the system and methods described herein may be used as a fact checker where an article, or any text entered into the display zone, is analyzed and facts retrieved from a remote database (e.g. one of the databases 126 shown in FIG. 1) may be used to verify claims provided in the article. Since the user has entered the word "India" in the document zone 202, the related data displayed in the related data display zone 208 identifies the total population of India and shows a graph of how the population has progressed over the years. It is to be appreciated that as the user types or enters other key words in the document zone 202, the system and methods described herein may retrieve further related data and supplement or replace the data shown in the discovered claims display zone 206 and the related data display zone 208.

Figure 5:
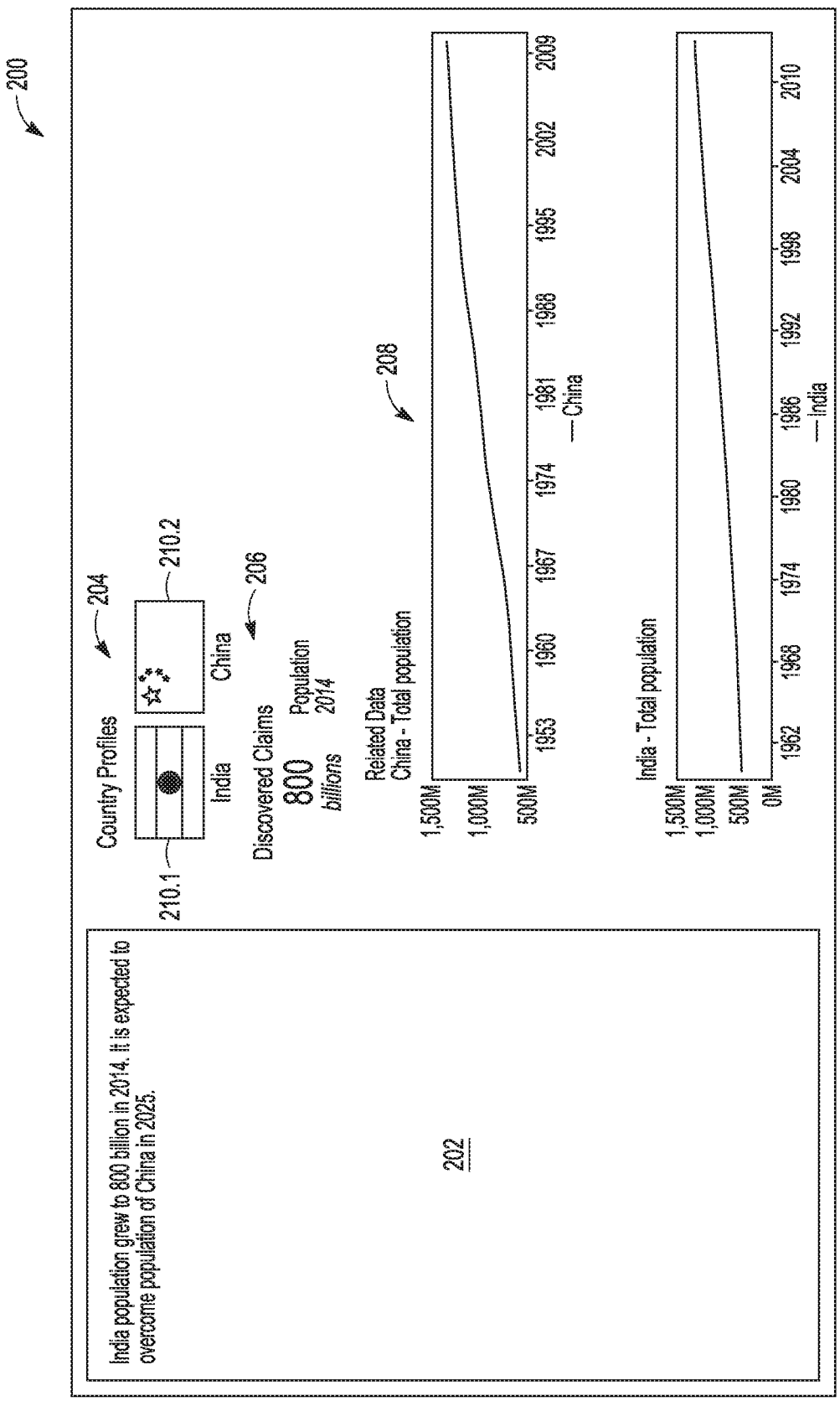
FIG. 5 shows the example GUI of FIG. 2 comparing some of the related data shown in FIG. 2 and FIG. 3.

FIG. 5 shows an example of the GUI 200 comparing some of the related data shown in FIGS. 2 and 3. As can be seen from FIG. 5, as the user enters further text in the document zone 202 (e.g. "It is expected to overcome the population of China in 2025"), the methods and systems described herein provide further related data on the fly to the text that has been entered. More particularly, as shown by way of example, the related data display zone 208 is shown to include a graph of the population growth of China and, in some example embodiments, comparative graphs are displayed.

Figure 6:
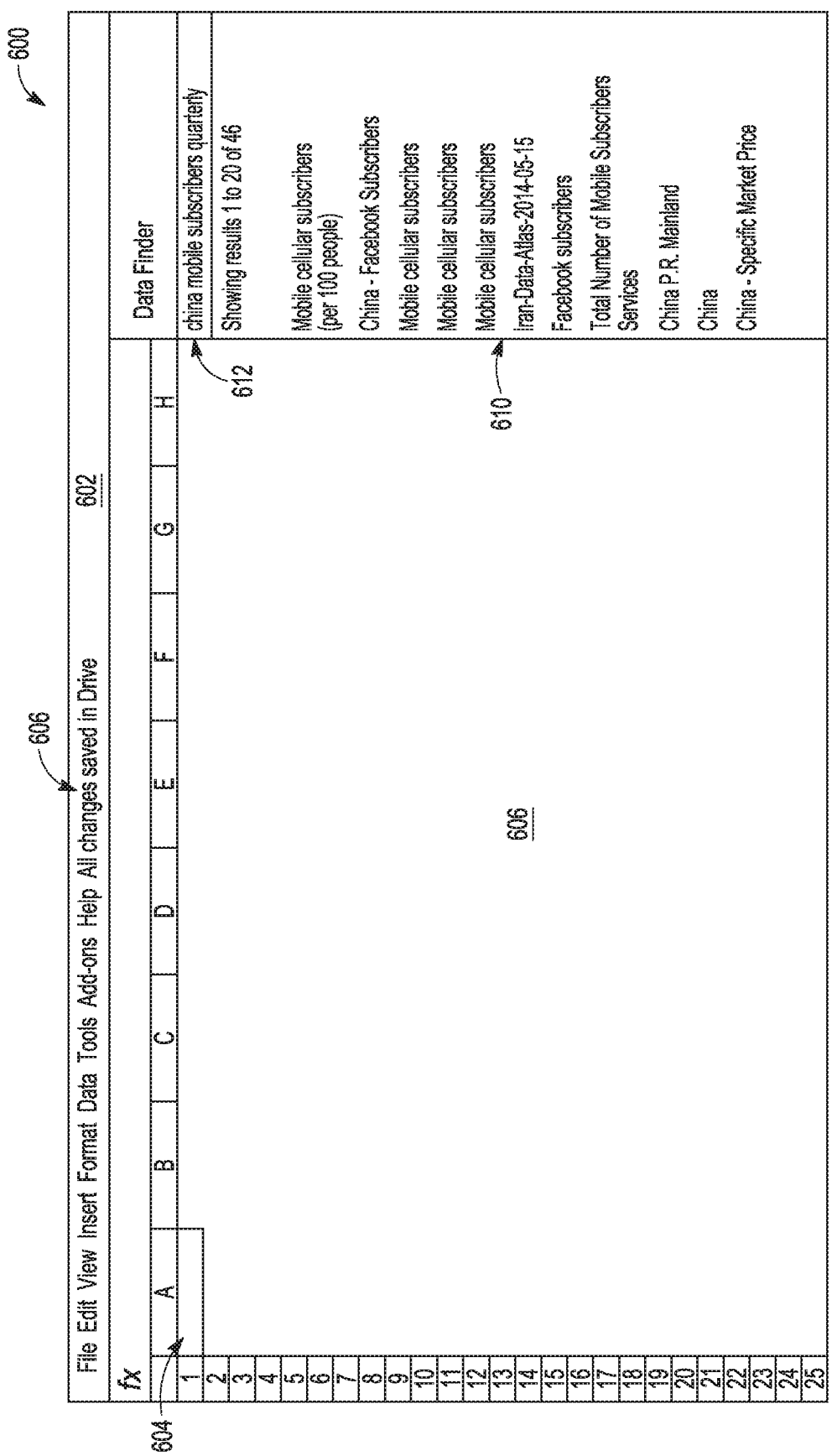
FIG. 6 shows a GUI, in accordance with an example embodiment, displaying a spreadsheet including a search field to identify related data for populating cells of the spreadsheet.

FIG. 6 is a GUI 600, in accordance with an example embodiment, displaying a spreadsheet 602 including a search field to identify related data for populating cells of the spreadsheet. The spreadsheet 602 may be a Microsoft Excel spreadsheet generated by a Microsoft Excel application and include a plurality of cells 604, a menu 606 for editing and creating spreadsheets, and so on. In an example embodiment, in accordance with an example embodiment, a related data plug-in to the Excel application is provided to automatically generate related data corresponding to data entered by a user into the spreadsheet 602. For example, the cell 604 of the spreadsheet, may define a document zone 608 (e.g., similar to the example document zone 202 in FIGS. 2-5) where a user may enter data. Upon entry of the information, related data is generated on the fly and displayed in a related data display zone 610. For example, assuming a user entered "China" in the cell 604, the plug-in would automatically identify related data as shown in the related data display zone 610.

Further, in an example embodiment, a search zone 612 is provided where a user may provide words or a sentence and the related data plug-in may then identify data specifically related to the terms or sentences that the user has entered in the display zone 610. For example, the GUI 600 is shown to include a user entering "china mobile subscribers quarterly" in the search zone 612. In response to entering the search terms, the related data plug-in identifies data related to specific information the user has entered. For example, as can be seen in the display zone 610, information regarding mobile cellular subscriptions, mobile cellular subscribers, Facebook subscribers, and the like is shown in the display zone 610.

Figure 7:
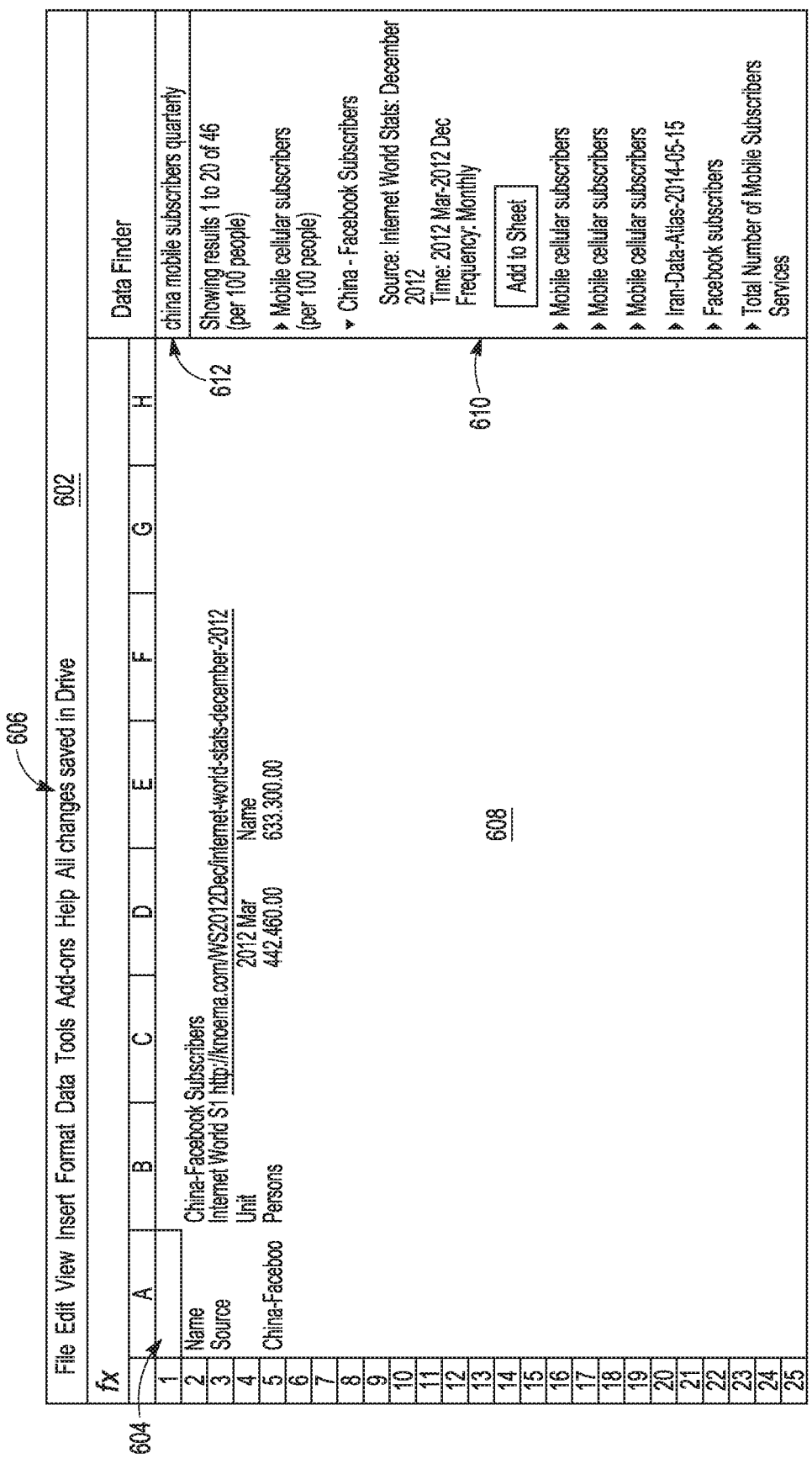
FIG. 7 shows the GUI of FIG. 6 including example source text and displaying data related to the source text.

FIG. 7 shows the GUI 600 of FIG. 6 including example source text and displaying data related to the source text. In FIG. 7, the GUI 600 is shown to include dropdown menus to allow the user to navigate and select further data for inclusion in the spreadsheet 602.

EXAMPLE DISCOVERED CLAIMS AND RELATED DATA FUNCTIONALITY

In an example embodiment, the methods and systems described herein provide a tool for identifying information or facts or claims from a variety of related articles (e.g., business related articles, geopolitical articles, sports articles, and so on) stored in a database, for example, the databases 126 of FIG. 1. For example, an electronic copy of the article may be analyzed by the methods and systems described herein and automatically provide, on the fly using a machine learning model, related facts and time series information to the user. In an example embodiment, one of the source documents may be a webpage or any formatted text, and the systems and methods described herein may identify structured facts extracted from this text (e.g., displayed as discovered claims and related data—see Figure retrieved from a data repository relevant to the text.

The facts or claims may be a set of numerical values associated with some indicator and region (e.g., "United States GDP"). Each value can also be characterized with a unit (e.g., "$"), a date (e.g., "2014"), and a direction of change (e.g., "increased to," "decreased to," or any other indication of a trend). For example, the sentence "It has also planned for a budget deficit of up to 1.62 trillion Yuan ($259 billion) for the year, 270 billion yuan more than last year." contains the following facts or claims:

{"Region": null, "Indicator": "budget deficit", "Values": [{"Value": "1.62 trillion", "Unit": "yuan", "Date": "the year", "Direction": null}, {"Value": "259 billion", "Unit": "$", "Date": "the year", "Direction": null}, {"Value": "270 billion", "Unit": "yuan", "Date": "last year", "Direction": "more"}]}

Figure 8:
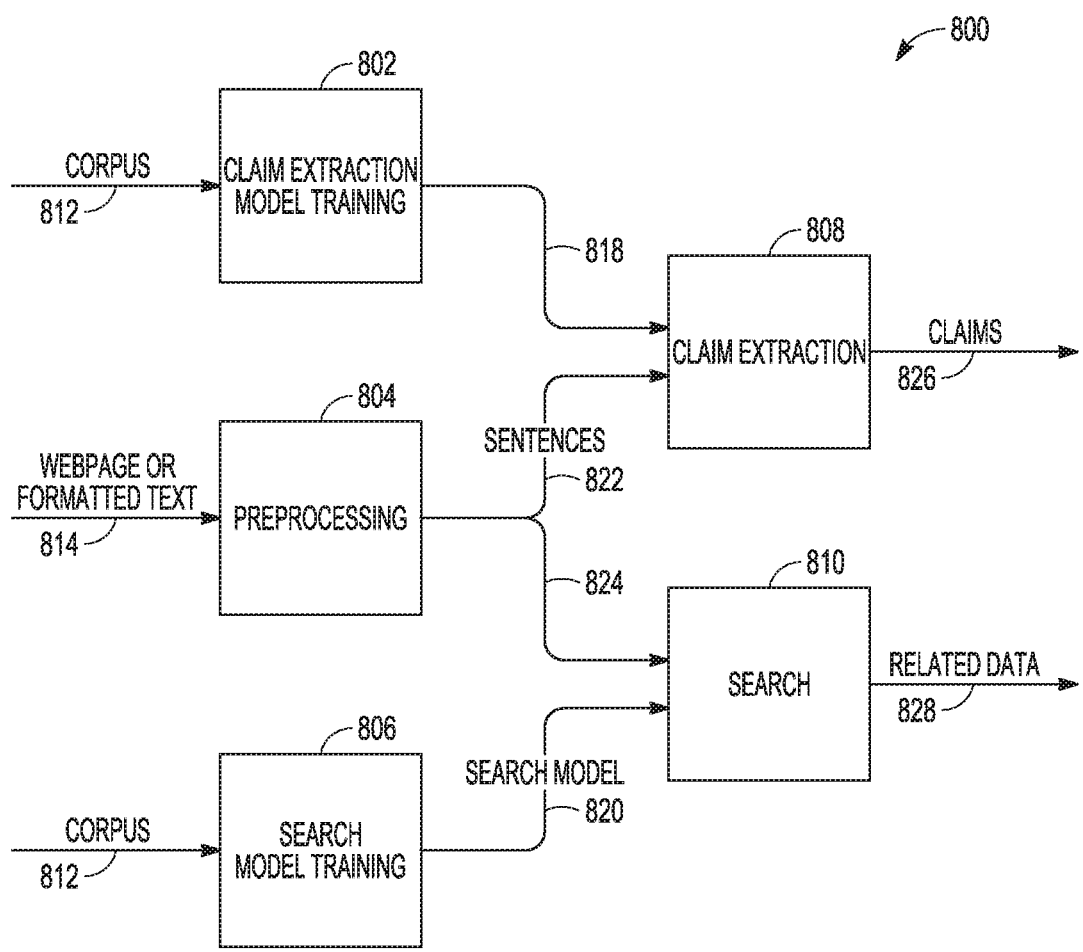
FIG. 8 is a flowchart of a method, in accordance with an example embodiment, for providing discovered claims and data related a source document.
Figure 9:
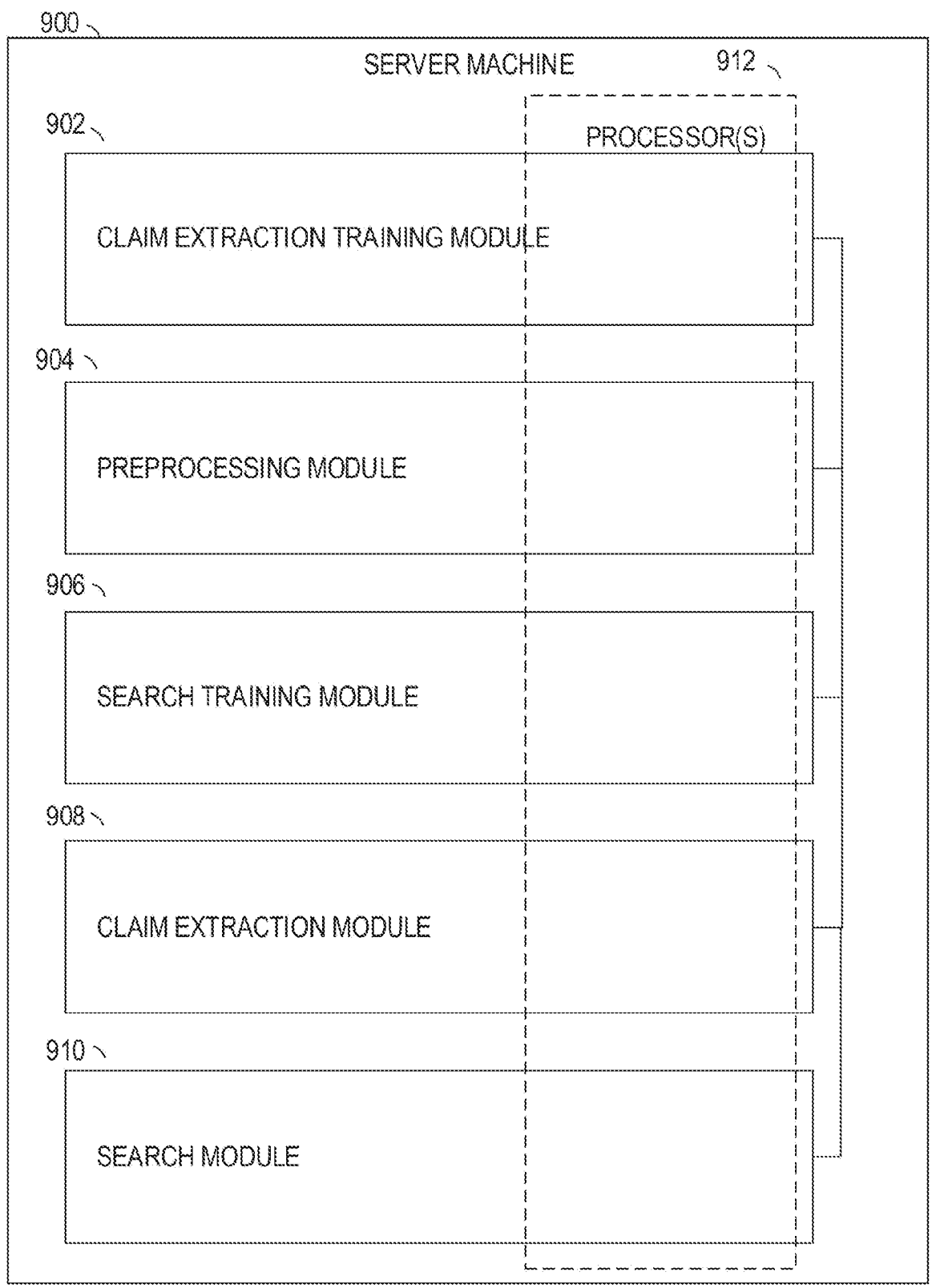
FIG. 9 is a block diagram illustrating components of a server machine, in accordance with an example embodiment, configured to provide discovered claims and data related a source document.

FIG. 8 is a flowchart of a method 800, in accordance with an example embodiment, for providing discovered claims and data related to a source document. The method 800 may be implemented by one or more of the application server(s) 140 (see in FIG. 1) and, accordingly, is described merely by way of example with reference thereto. More particularly, example components of a server machine (e.g. one or more of the training system(s) 142) are shown in FIG. 9. FIG. 9 is a block diagram illustrating components of a server machine 900, in accordance with an example embodiment, configured to provide discovered claims and data related a source document. The server machine 900 is shown to include a claim extraction training module 902, a preprocessing module 904, a search training module 906, a claim extraction module 908, and a search module 910. The modules 902-910 may execute on one or more processors 912. As the method 800 may be performed by the server machine 900, it is described merely by way of example with reference thereto.

Returning to FIG. 8, the method 800 is shown to include a claim extraction model training operation 802, a preprocessing operation 804, a search model training operation 806, a claim extraction operation 808, and a search operation 810. In the example method 800, claim extraction and searching are based on machine learning. The method 800 includes training based on a corpus 812 (e.g., articles or any other text in a specific field or subject matter). The corpus 812 provides input to both the claim extraction model training operation 802 and the search model training operation 806. Thus, in an example embodiment, the method 800 is trained on a set of examples (corpus) to produce two models using machine learning. The one model is used for claim extraction and the other is used for searching of related data. Accordingly, the claim extraction operation 808 and the search operation 810 receive inputs from both the claim extraction model training operation 802 and the search model training operation 806 (see 818 and 820).

In the example method 800, the source document is shown in the example form of a webpage or formatted text (see 814). For example, the GUI 200 may be used by the method 800 to receive a source document. For example, this source document may be provided in the document zone 202. The source document is then processed by the preprocessing operation 804 to generate outputs (e.g., sentences 822) that are fed into the claim extraction operation 808 and the search operation 810 (see 824). The method 800 provides outputs including claims (see 826) and related data (see 828). Thus, in an example embodiment, the method 800 processes a source document (e.g., a webpage or formatted text 814) and provides related to associated claims 826 and related data 828 which may then be presented and displayed to a user. For example, the user may be reading a webpage and the method 800 may then, on the fly, automatically present claims 826 and related data 828 that has been identified based on particular words present in the text of the source document.

When the source document is a webpage, the preprocessing operation 804 converts an article displayed in the webpage from Hypertext Markup Language (HTML) or formatted text to raw text. The raw text is tokenized, for example, using an OpenNLP Tokenizer. It will, however, be appreciated that any toolkit for Natural Language Processing (NLP) may be used that, for example, includes implementations of many popular NLP algorithms. OpenNLP includes analyzer chain tools for sentence detection, tokenization, parts-of-speech tagging (nouns, verbs, etc.), chunking (e.g., parsing into noun phrases, verb phrases, etc.), and named entity recognition.

Figure 10:
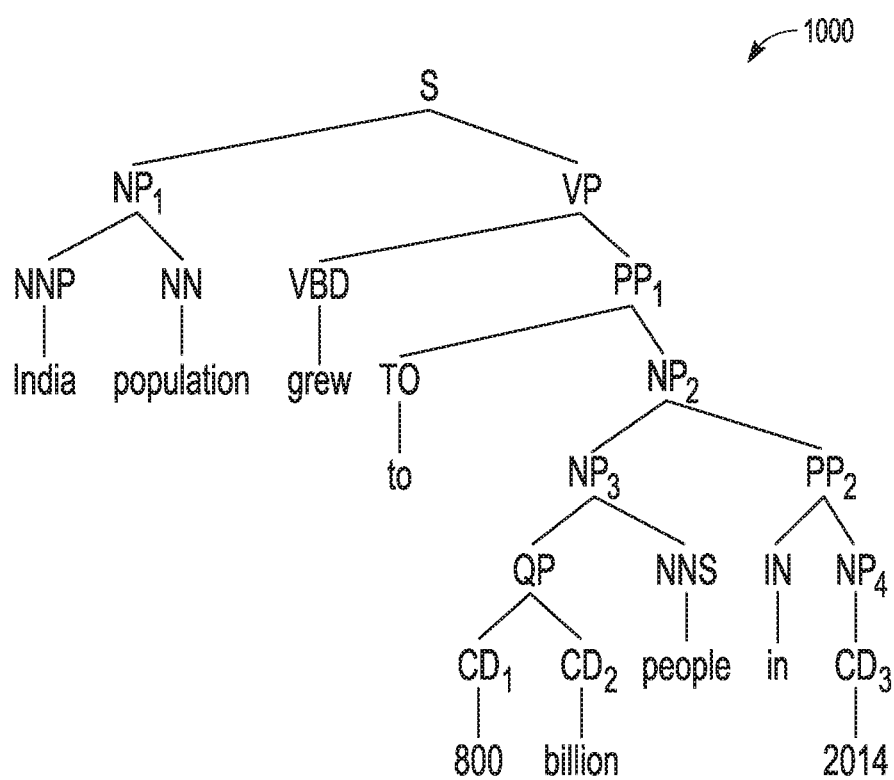
FIG. 10 is a diagram illustrating an example syntax tree used in the method of FIG. 8.
Figure 11:
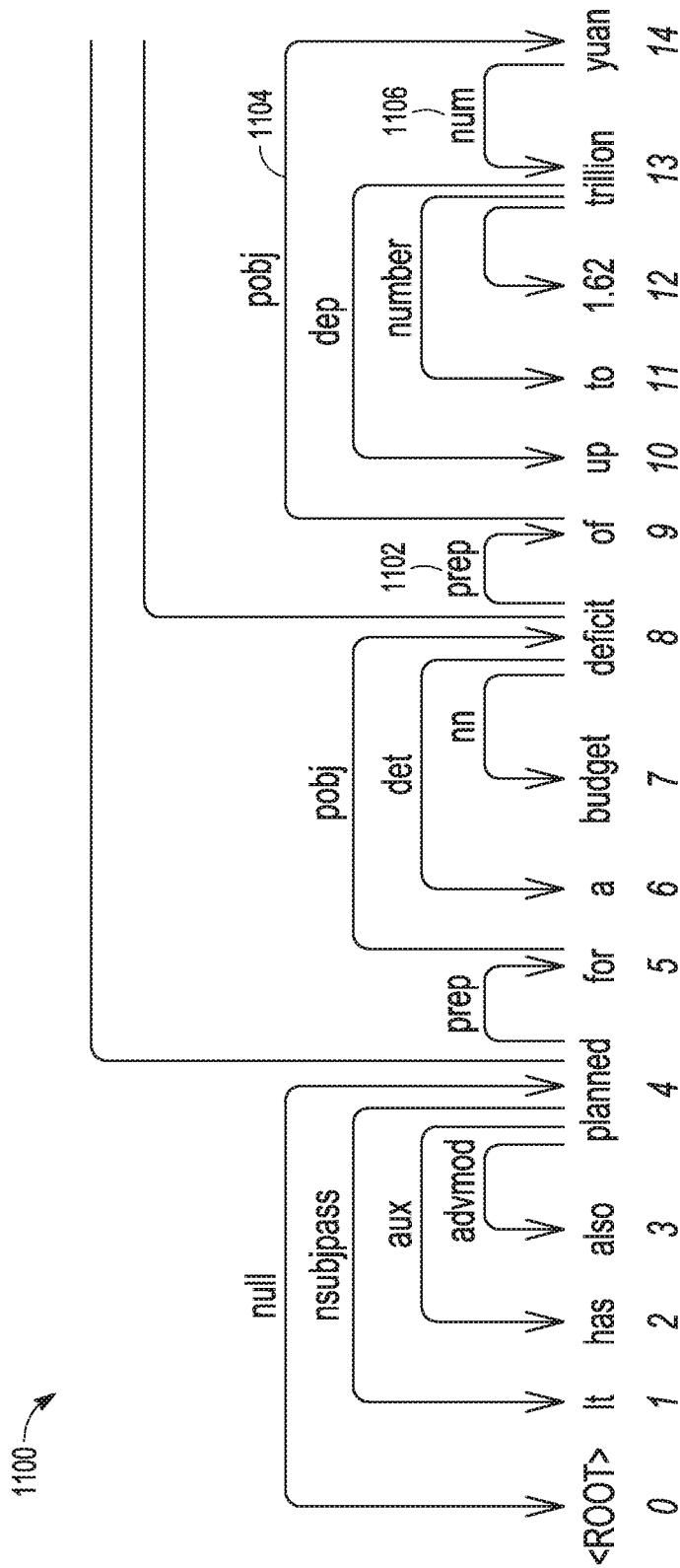
FIG. 11 is an example dependency tree used by the method of FIG. 8.

Returning to the preprocessing module 804, boundaries of sentences are determined from the tokenized raw text, for example, using an OpenNLP Sentence Detector. A Syntax tree (e.g., the syntax tree 1000 shown in FIG. 10) is then built for each sentence, for example, using an OpenNLP Parser. FIG. 11 is an example dependency tree generated by the method of FIG. 8 for an example sentence. It will be appreciated that a dependency tree may be built for each sentence in the source document.

EXAMPLE CLAIM OR FACT EXTRACTION MODEL TRAINING

Returning to the claim extraction model training operation 802 in FIG. 8, for a corpus 812 comprising a set of articles, text of each article is marked with tags. When, for example, the articles are geopolitical articles relating to different countries of the world, six tags may be used. For example, the tags may include "indicator", "region", "value", "unit", "date" and "direction". In this given example, one tag is provided for each part of a claim. Each claim may have a "value" with an attribute "id" by which it can be referenced from other tags to form relations. Other tags may have an attribute "refs" to indicate values to which the tag is related.

Following the example above, next markup may be generated:

"It has also planned for a <indicator refs="1,2,3">budget deficit</indicator> of up to <value id="1">1.62 trillion</value> <unit refs="1">yuan</unit> (<unit refs="2">$</unit><value id="2">259 billion</value>) for <date refs="1,2">the year</date>, <value id="3">270 billion</value> <unit refs="3">yuan</unit> <direction>more</direction> than <date refs="3">last year</date>"

The claim extraction model used in the operation 808 may include two components, namely, a custom entity recognition model (which may be used to find named entities such as indicators, regions, units, etc. in the source text) and a relation extraction model (which may be used to find relationships between entities). In an example embodiment, the training operation of the claim extraction model 802 is performed in two steps. At the first step of the training operation 808, marked entities are extracted, the source document is preprocessed, and marked relations are extracted as described by way of example in more detail below.

Figure 12:
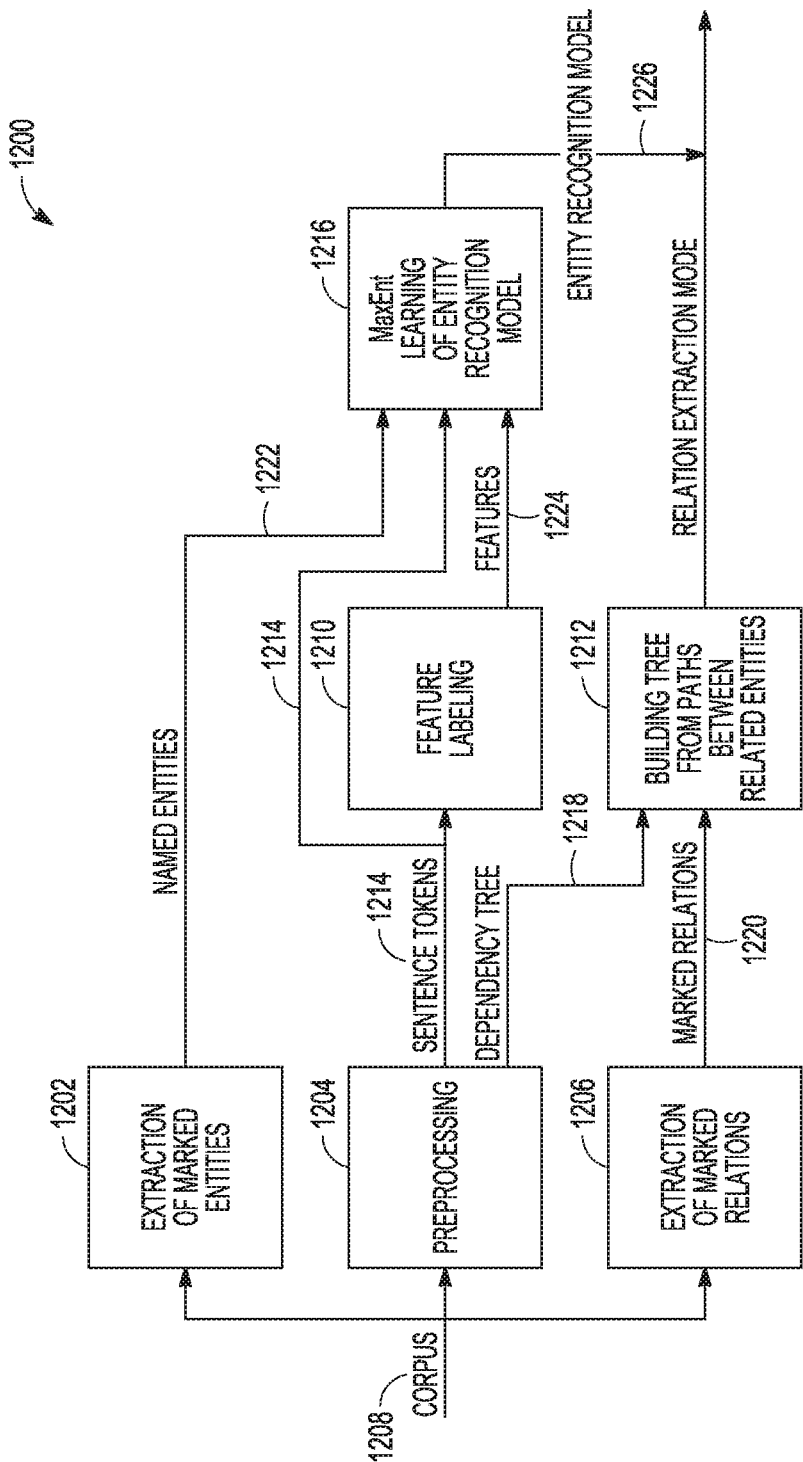
FIG. 12 is a flowchart of a method, in accordance with an example embodiment, for claim extraction from a corpus stored in a database.

FIG. 12 is a flowchart of a method 1200, in accordance with an example embodiment, for claim extraction from a corpus stored in a database (e.g., stored in the database(s) 126). The method 1200 is shown to include an extraction of marked entities operation 1202, a preprocessing operation 1204, and an extraction of marked relations operation 1206. Each of these operations 1202-1206 receives text from a source document (e.g., an article or any other document) forming part of the corpus 1208. The extraction of marked entities operation 1202 identifies entities in the source document that have been marked and removes their associated tags, and adds the entities to a collection. For example, assuming the source document includes the words "budget deficit" in text, these words and their positions within an associated sentence may then be added or stored in the collection. The preprocessing operation 1204 may, for example, function in a same or similar way to the preprocessing operation 804 shown in FIG. 8. The extraction of marked relations operation 1206 identifies relationships between the identified marked entities as well as, for example, numerical claims in the source document. Continuing the example above, the extraction of marked relations operation 1206 may identify a numerical value, for example, "1.62 trillion" related to the entity "budget deficit" and store the resultant relation in the collection.

The second step includes the feature labeling operation 1210 and the building tree from paths between related entities operation 1212. As shown in the method 1200, sentence tokens 1214 generated by the preprocessing operation 1204 are fed into the feature labeling operation 1210 as well as into the Maximum Entropy learning of entity recognition model 1216. The preprocessing operation 1204 provides the dependency tree 1218 (e.g., see FIG. 11) to the building tree from paths between related entities operation 1212. Marked relations 1220 output from the extraction of marked relations operation 1206 also feeds into the building tree from paths between related entities operation 1212.

Returning to the feature labeling operation 1210, in an example embodiment, each token range in each sentence is labeled with features. A feature includes some characteristic of a range of tokens. For example, "budget deficit" may be a range of tokens. The features may influence whether or not a range represents a named entity. Thus, tokens include a sequence of characters representing a semantic unit (e.g., every word or punctuation mark may define a token). In an example embodiment, there are however some exceptions. For example, "doesn't" may include two tokens: "does" and "n't"). A token range includes any continuous sequence of tokens from a sentence and is characterized by starting and ending positions in a sentence. For example, "budget deficit" is an example of token range, which includes two tokens: "budget" and "deficit". In the example sentence this token range starts at position 7 and ends at position 8 (see FIG. 11). Tokens may or may not be entities. For example, the sentence "also planned for a" has a token range of four tokens. But this example is just a sequence of tokens and not an entity. On the other hand, the token range "budget deficit" from the same sentence is an entity as it refers to a concept of potential interest to the user.

In an example embodiment, the claim extraction model may be stored in the database(s) 126 and may include, but not limited to, the following types of features: syntax features, similarity features, and N-gram features.

Each range of tokens maybe labeled with its associated part of speech based on a syntax tree. For example, the token range "a budget deli cit" may be labeled with "NP" meaning that it is a Noun Phrase (see the example syntax tree 1000 shown in FIG. 10). If a range of tokens does not correspond to a whole sub-tree in syntax tree, then the least subtree which covers all of the range may be chosen. For example, the token range "budget deficit" is covered by a NP node, but since the node has an extra sub-tree with token "a", the node will be labeled "NP1". Accordingly, a number after the label "NP" is the number of extra sub-trees.

If database contains terms similar to a range of tokens, then the range may be labeled as similar to an associated entity in a database. For example, the token "yuan" will be labeled by feature "unit9" indicating that word "yuan" is present in a database table that contains units. The number "9" may signify the degree of similarity between the token and the term in the database. A degree of similarity is calculated by the formula:

$$\text{Degree of similarity} = \text{Covered part} * \text{Used Part}$$

where "used part" is a fraction of tokens in a token range that correspond to a similar term in a database. The "covered part" is a fraction of the tokens from similar terms in the database that are present in the token range. For example, if a degree of similarity between a token and a term in the database is greater than 0.9, then number "9" is added to the label; if degree of similarity is less than 0.9 but greater than 0.6 then number "6" is added to the label; and so on. The third example of features used in the claim extraction model are N-gram features.

The Maximum Entropy learning of entity recognition model 1216 receives named entities 1222, sentence tokens 1214, and features 1224, which are then processed to generate an entity recognition model 1226. In an example embodiment, the maximum entropy learning of entity recognition model 1216 is an OpenNLP software module. Algorithms of the OpenNLP software model may identify optimal values for entity recognition model parameters (e.g., weight coefficients for each possible feature).

Returning to the building tree from paths between related entities operation 1212, in an example embodiment, for each marked relation (a pair of two entities) in the collection of extracted relations (see marked relations 1220), corresponding nodes in a dependence tree 1218 are determined. Thus, a path in a dependency tree between these entities is found. For example, in the dependency tree 1100, the path between entities "budget deficit" and "1.62 trillion" is identified as "+"prep"->+"pobj"->+"num" (see paths 1102, 1104, and 1106 in FIG. 11). In the given example, a plus sign ("+") indicates that the direction of a path coincides with the direction of an arc in the dependency tree 1100. Paths from all marked relations are stored in a dependency tree to facilitate searching of similar paths.

Figure 13:
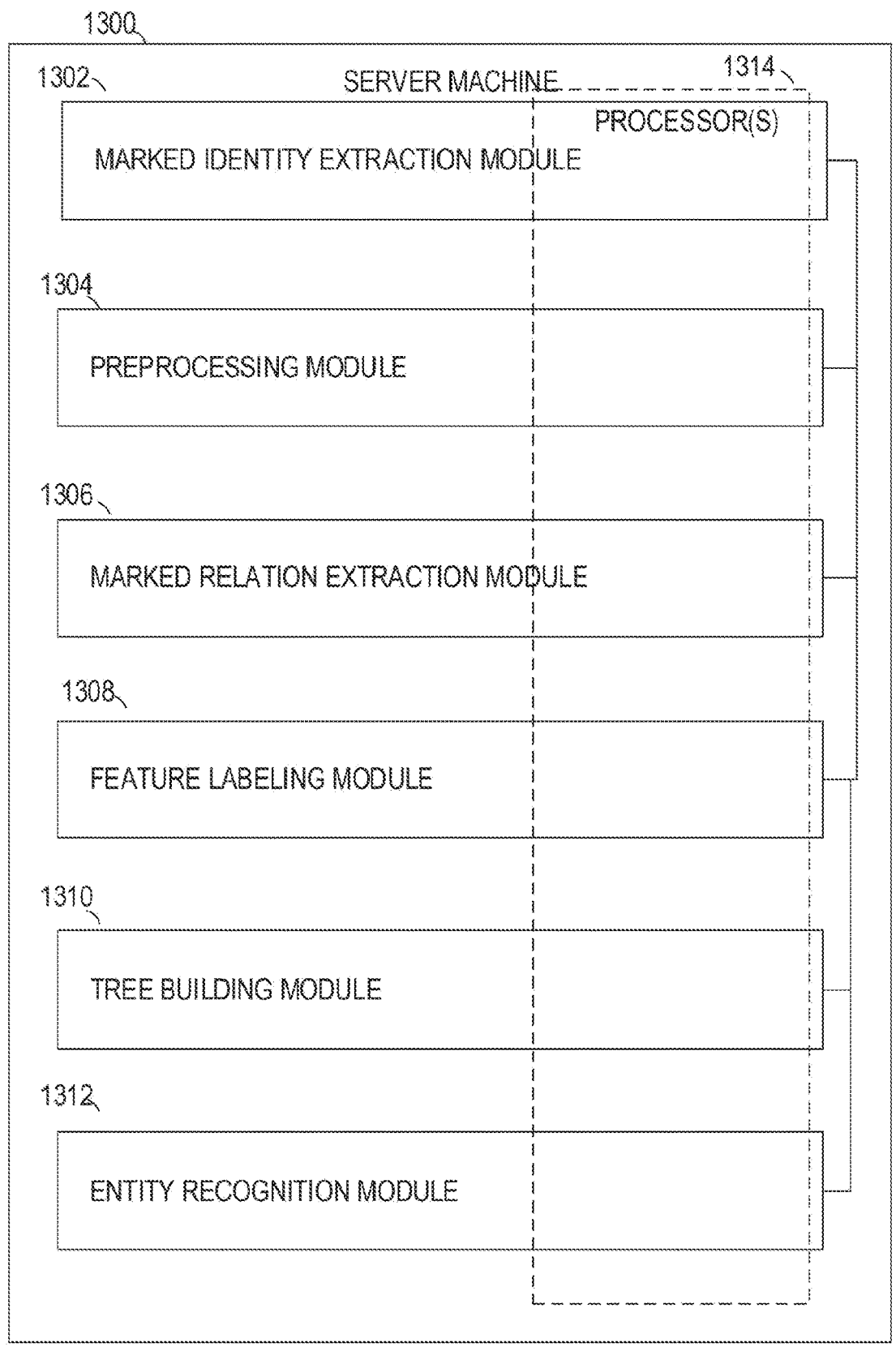
FIG. 13 is a block diagram illustrating components of a server machine, in accordance with an example embodiment, configured to perform extraction from a corpus.

FIG. 13 is a block diagram illustrating components of a server machine 1300 able to perform claim extraction. The server machine 1300 may be configured to perform the method 1200 and, accordingly, is described merely by way of example with reference thereto. The server machine 1300 is shown to include a marked entity extraction module 1302, a preprocessing module 1304, a marked relation extraction module 1306, a feature labeling module 1308, a tree building module 1310, and an entity recognition module 1312. The modules 1302-1312 execute on one or more processors 1314. It will be appreciated that, in some example embodiments, one or more of the modules 1302-1312 may be combined and further modules may be included in the server machine 1300.

The marked identity extraction module 1302 may implement the functionality of the extraction of marked entities operation 1202, the preprocessing module 1304 may perform the functionality of the preprocessing operation 1204, the marked relation extraction module 1306 may perform the functionality of the extraction of marked relations operation 1206, the feature labeling module 1308 may perform the functionality of the feature labeling operation 1210, the tree building module 1310 may perform the functionality of the building tree from paths between related entities operation 1212, and the entity recognition module 1312 may perform the functionality of the maximum entropy learning of entity recognition model 1216.

EXAMPLE FACT OR CLAIM EXTRACTION

Figure 14:
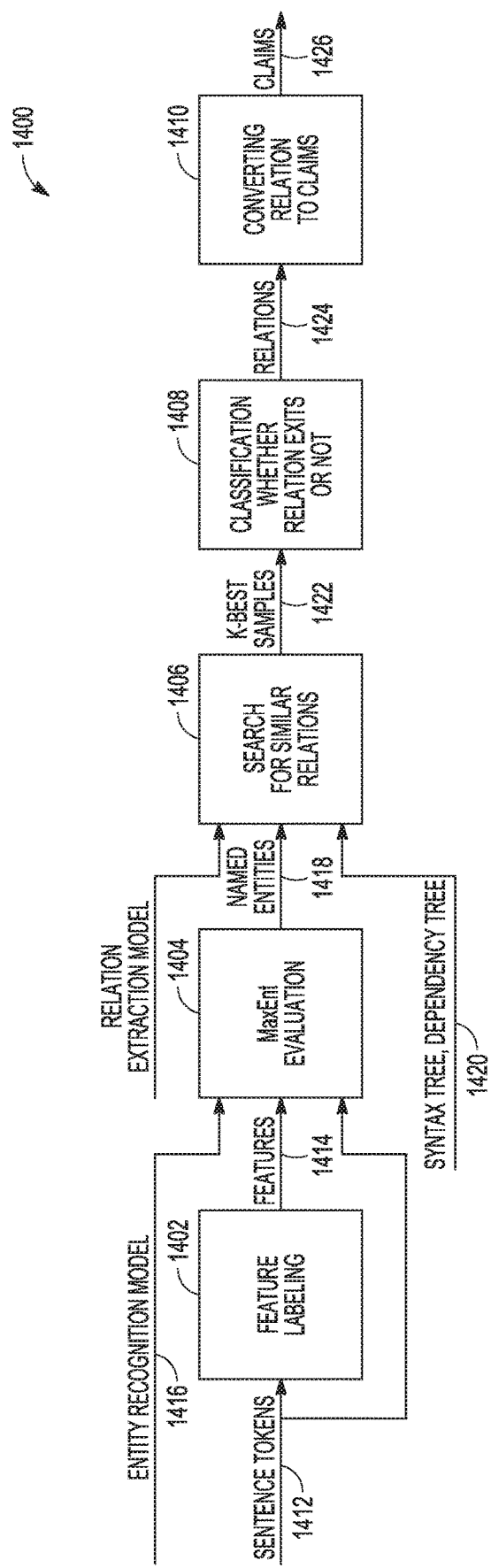
FIG. 14 is a flowchart of a method, in accordance with an example embodiment, for extracting facts or claims from sentences of a source document.

As mentioned above with reference to the GUI 200, some of the methods and systems described herein extract facts or claims from a source document and display the claims in the discovered claims display zone 206. FIG. 14 is a flowchart of a method 1400, in accordance with an example embodiment, for extracting claims from sentences in a source document (e.g., provided in the source document zone 202). The method 1400 may be performed by the claim extraction operation 1008 shown in FIG. 10. The method 1400 is shown to include a feature labeling operation 1402, a maximum entropy evaluation operation 1404, a search for similar relations operation 1406, a classification whether a relation exists or not operation 1408, and a converting relation to claims operation 1410.

In an example embodiment, claim or fact extraction requires the following inputs: pre-processed article text (e.g., tokenized with detected sentences and built syntax and dependency trees) and a claim extraction model (e.g., which comprises the entity recognition and relation extraction models). In the feature labeling operation 1402, sentence tokens 1412 are labeled with features in the same or similar way as during the claim extraction model training (see the example method 1200 of FIG. 12). The feature labeling operation 1402 produces features 1414 that are fed into the maximum entropy evaluation operation 1404. The maximum entropy evaluation operation 1404 is also shown to receive the entity recognition model 1416 (see the model 1216 in FIG. 12) and the sentence tokens 1412 and features 1414. An output of the maximum entropy evaluation operation 1404 is thus based on sentence tokens from the pre-processing operation 1004), the labelled features 1414 determined by the feature labeling operation 1402, and the entity recognition model (see operation 1416 in FIG. 12). For each range of tokens, the probability of the range being a named entity of particular type is found using a maximum entropy evaluation algorithm available from, for example, OpenNLP. Ranges with a probability less than a threshold value may be discarded. An output of the maximum entropy evaluation operation 1404 is a collection of named entities 1418 with associated positions in the text of an article. The collection of named entities 1418 is then fed into the search for similar relations operation 1406.

Figure 15:
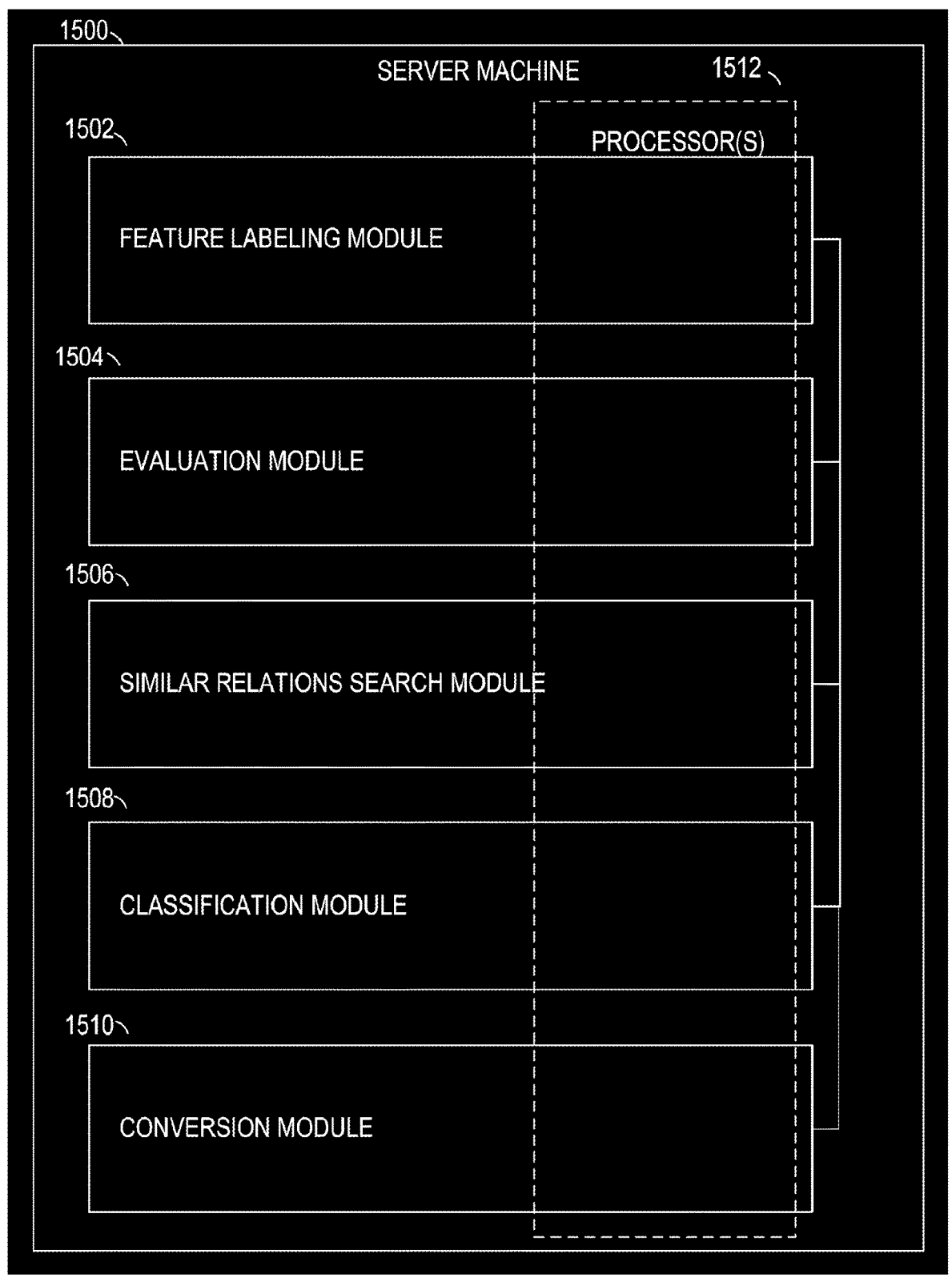
FIG. 15 is a block diagram illustrating components of a server machine, in accordance with an example embodiment, configured to extract facts or claims from sentences of a source document.

In the search for similar relations operation 1406, for named entities found in the evaluation operation 1404, all possible pairs of named entities 1418 are generated. In an example embodiment, for each pair of entities, a plurality K of the most similar pairs are found. The most similar pairs may be determined in the dependency tree (e.g., see syntax tree/dependency tree 1420) from paths between related entities (see operation 1212 in FIG. 12). The similarity between the pairs may be measured by a tree kernel or any function that defines how similar two dependency trees are. The K best samples 1422, determined in operation 1406, are then fed into the classification operation 1408. The classification operation 1408 then determines whether a relation exists, or does not exist, between at least some entities. More particularly, in an example embodiment, each pair of entities is classified as a relation (or not) based on a support vector machine algorithm applied to the K best samples 1422 determined in operation 1406. The classification operation 1408 provides relations 1424 to the converting operation 1410 that converts the relations 1424 into claims 1426. The claims may then be displayed in the GUI 200 (e.g., see the discovered claims display zone 206), FIG. 15 is a block diagram illustrating components of a server machine 1500, in accordance with an example embodiment, configured to extract claims from sentences of a source document. The server machine 1500 may implement the method 1400 and, accordingly, is described merely by way of example with reference thereto.

The server machine 1500 is shown to include a feature labeling module 1502, an evaluation module 1504, a similar relations search module 1506, a classification module 1508, and a conversion module 1510. The modules 1502-1510 execute on one or more processors 1512. The feature labeling module 1502 may perform the functionality of the feature labeling operation 1402, the evaluation module 1504 may perform the functionality of the maximum entropy evaluation operation 1404, the similar relations search module 1506 may perform the functionality of the search for similar relations operation 1406, the classification module 1508 may perform the functionality of the classification whether relation exists or not operation 1408, and the conversion module 1510 may perform the functionality of the converting relation to claims operation 1410. It will be appreciated that one or more of the modules 1502-1510 may be combined and, in the example embodiments, further modules may be provided.

EXAMPLE RELATED DATA SEARCH MODEL TRAINING

In an example embodiment, the machine-learning model for related data search includes a set of coefficients that control a relevance of time series to natural language text. For instance, this set may contain weight coefficients for each part of speech in primary words, coefficients to calculate a weight for set of words (N-grams, see https://en.wikipedia.org/wiki/N-gram), bonus coefficients for fully covered N-grams, penalty coefficients for absent (not found) words in terms and absent (not covered) dimensions in time series, weight reduce coefficients for similar time series, etc. The weight calculation may indicate a measure of relevance of sentence and article to time series data. The machine-learning model may be trained on a corpus comprising a set of articles. It will be appreciated that the subject matter described in the training articles corresponds to the subject matter to which the requested related data pertains. Accordingly, if the system (or part of the system) is configured to provide related data on the fly for geopolitical subject matter entered into the source document zone 202 (see FIG. 2), then the training articles are articles related to geopolitical information and claims. Likewise, if the system (or part of the system) is configured to provide related data on the fly for business systems, then the training articles are articles related to business information and claims, and so on. Each article may be linked with the sample time series. For example, each article may have a list of time series keys or, for instance, identify time series words, which may uniquely identify each time series depending on time series database storage architecture. Then each linked time series may have a score of its relevance to text in a training article.

Scores may be collected from experts in the specific subject matter and the articles selected by the experts.

The model training is configured to find a set of coefficients, which maximize a target function. In an example embodiment, a target function is calculated as F-measure:

$$F_\beta = \frac{(1+\beta^2)\cdot \text{true positive}}{(1+\beta^2)\cdot \text{true positive} + \beta^2 \cdot \text{false negative} + \text{false positive}}.$$

where true positive is a result that indicates a given time series is related to the article, when it actually does, false positive is a result that indicates a given time series is found as related to the article, when it actually does not, false negative is when time series is not found as related to the article, while actually it is related and beta is emphasis coefficient between precision and recall. Precision is the number of correct positive results divided by the number of all positive results and Recall is the number of correct positive results divided by the number of positive results that should have been returned. So, for example, $F_2$ is measure, which weights recall higher than precision, and $F_{0.5}$ is measure, which weights precision higher than recall. Training process may be adapted to end user needs (more positive results or less negative results) by choosing this beta coefficient before training process.

It should be noted that the corpus of documents used to train a data repository may be obtained from various different sources. For example, documents relating to a specific subject matter may be obtained through searches on the Internet. Thus, in example embodiments, a data collection platform is provided to collect data on an on-going basis (e.g., on a daily or weekly basis). The documents may then be reviewed for quality by a domain expert and then be injected into one or more training systems. For example, the documents may be fed into the one or more training systems 142 (see FIG. 1), which may then process the documents using the method 1200 (see FIG. 12). Both automated and/or manual review of the source documents may be performed.

The source documents in the data repository may be obtained from public and/or private data repositories.

EXAMPLE RELATED DATA SEARCH FUNCTIONALITY

Figure 16:
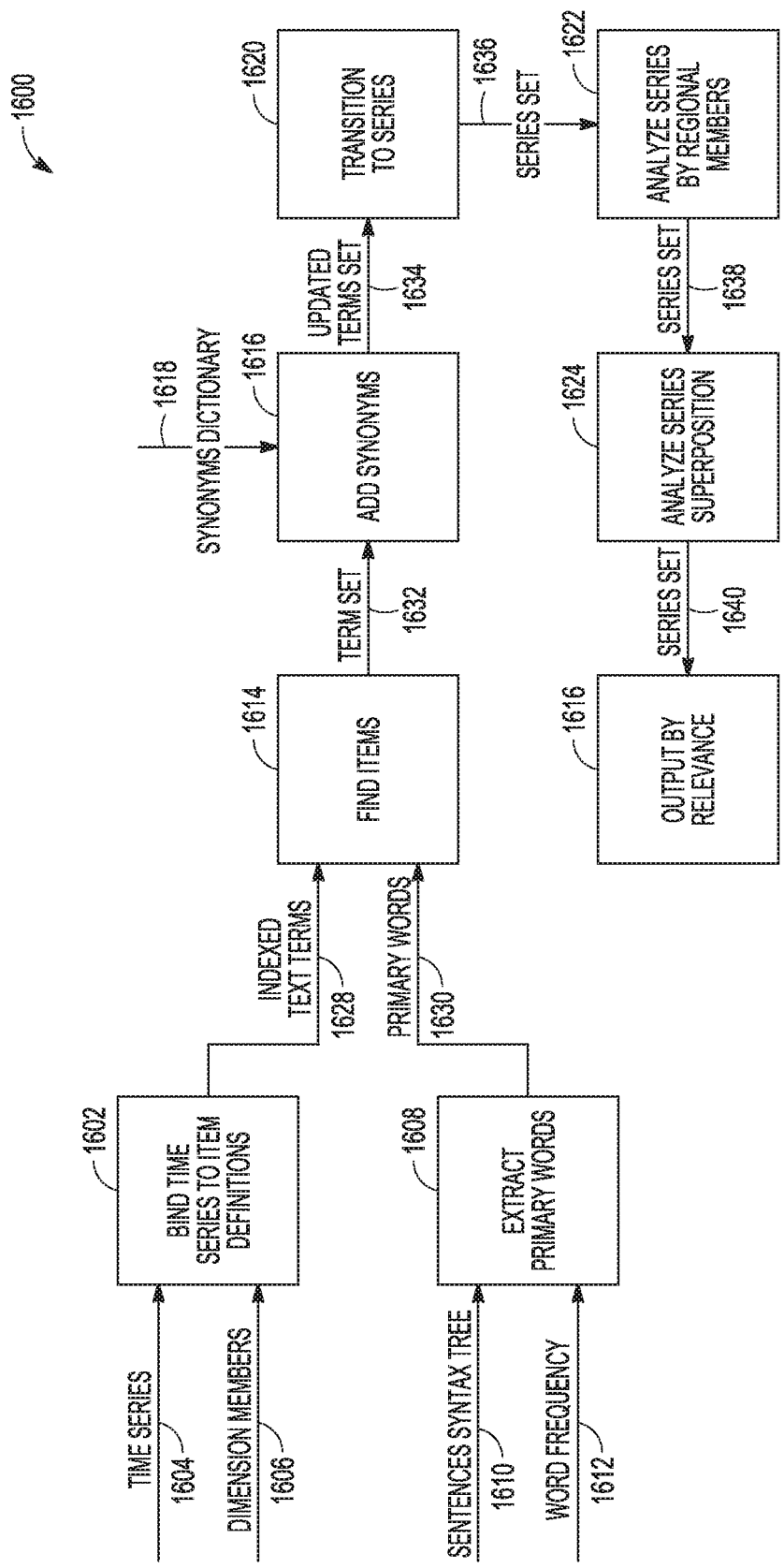
FIG. 16 is a flowchart of a method, in accordance with an example embodiment, for identifying data related to a source document.

Referring to FIG. 16, a flowchart of a method 1600, in accordance with an example embodiment, for identifying data related to a source document is shown. The method 1600 may be performed on the client-server-based network architecture 100 and, accordingly, is described merely by way of example with reference thereto. The method 1600 may use a machine learning customized repository to retrieve data related to a source document. The data repository may be stored in the one or more databases 126. In an example embodiment, the data repository includes one or more collections of datasets which include time series data representing factual values (e.g., GDP, population, value of the Dow Jones, S&P, 400, sales figures, or any other data) that vary over time with additional metadata (dimensions) to classify the datasets. In an example embodiment, the basic unit of data or information is the dataset. Each dataset may contain structured information on a specific topic and have a name, a description, a source and a publication date. It will be appreciated that the structured information may vary dependent upon the subject of the dataset. For example, a dataset corresponding to sports data will be different from a dataset corresponding to geo-political data. Optionally, users can upload their own datasets into the data repository using a dataset upload tool. For example, the third party server(s) 130 may upload customized datasets using the third party application(s) 132. Like any other resource, datasets can be shared, pinned, discussed, and so forth.

In an example embodiment, each dataset includes observations or records that hold numerical values (data) and descriptive information (metadata) about these values. Metadata may be used typically to categorize data (structural metadata) or provide additional information about data (referential metadata). In the example embodiments provided in FIGS. 3-6, a dataset that relates to different countries is accessed. Accordingly, a data repository is accessed that includes structural metadata in the form of geopolitical data including, for example, country/region information, name of indicator, and so on. Referential metadata may be used to keep various notes/comments about data. Further, data in the repository may be stored using in an appropriate ontology defining information in a certain domain (e.g., a geopolitical domain) using concepts and relationships. Different ontologies may be used in different embodiments where each ontology is customized for the particular subject matter. Thus, for example, when a user is reading (or writing) a sports-related article then a data repository with a customized sports ontology may be accessed, when a user is reading (or writing) a geopolitical article then a data repository with a customized geopolitical ontology (e.g., the data repository provided by Knoema Corporation) may be accessed, and so on.

Each dataset may have a number of associated dimensions used to categorize data in the dataset. Each dimension may be an ordered hierarchical list of values or dimension members. The dimensions of a dataset may be used as filters when accessing data. For example, if the data repository is a geopolitical data repository, a dataset including country and indicator dimensions may be provided. A user can then select all population data for United States by setting a filter to Country=United States and Indicator=Population.

The data repository, for example, stored in the database(s) 126, may include discovered claims or facts. Each discovered fact or claims can be a numerical value identified in a source document (e.g., the source text entered into the document zone 202 in FIG. 4) attributed with its name of indicator, a unit of measurement, a date, and a region. For example, the following sentence "The US government on Wednesday reported that consumer spending rose 1.9% in the first quarter" will produce discovered claim with a value of 1.9, a unit of %, a region of US, and a date of the first quarter. Further, the data repository may include related data including datasets and time series from a data repository that is relevant by meaning to the source text.

Returning to FIG. 16, the method 1600 is shown to include various example operations. More particularly, the method 1600 is shown to include a bind time series to term definitions operation 1602, an extract primary words operation 1608, a find terms operation 1614, an add synonyms operation 1616, a transition to series operation 1620, an analyze series by regional members operation 1622, an analyze series by superposition operation 1624, and an output by relevance operation 1626. In use, time series data 1604 and dimension members 1606 are fed into the bind time series to term definitions operation 1602. Example of the time series data 1604 may include "India Population", "China GDP", "Sales Data", "Electricity production from renewable sources in the World", "Growth of mobile users per population by country" and any other data that changes over time. Here examples of dimension members include "India", "China", "Population", "GDP", "Electricity production", "Mobile users". As described in more detail below, in operation 1602, time series data is bound to term definitions by the text of members, which identify the time series data.

For example, consider a dataset named "World Development Indicators" with dimensions Regions and. Indicators:

| Regions |
| --- |
| USA |
| China |
| India |
| Russia |

| Indicators |
| --- |
| Gross domestic product, USD |
| Population, total |
| Population growth, percent |
| Unemployment rate, percent |
| Inflation rate, percent |

The time series "China population", which is identified by members [Regions].[China] and [Indicators].[Population, total] may be bound to corresponding text terms "China" and "Population, total". Binding may be performed as indexing text terms by its words, dimension members by its text terms and, finally, indexing time series by its members.

The extract primary words operation 1608 receives a sentence syntax tree 1610, and word frequency data 1612. The operation 1608 uses a trained model (e.g., using machine learning) in which "Noun" parts of speech, which are not inside an adverb phase or a prepositional phrase, are considered as primary words for search in a machine learning trained data repository. For example, in the GUI 200 shown in FIG. 5 where both India and China are entered into the document zone 202, the method 1600 extracts the words "India" and "China" based on "Proper Noun" part of speech criteria, and "population" based on "Noun" part of speech criteria. It is to be appreciated that various other rules and criteria may be applied when analyzing the source document.

As mentioned above, the extract primary words operation 1608 receives the sentence syntax tree 1610 and the word frequency data 1612. Continuing with the example text entered into the document zone 202 shown in FIG. 5 ("India population grew to 800 billion people in 2014. It is expected to overcome China population in 2025."), it will be noted that the text includes two sentences. The first sentence "India population grew to 800 billion people in 2014" may be represented as the following example syntax tree: [S [NP [NNP India] [NN population]] [VP [VBD grew] [PP [TO to] [NP [NP [QP [CD 1600] [CD billion]] [NNS people]] [PP [IN in] [NP [CD 2014]]]]]]]. (See the syntax tree 1000 shown in FIG. 10). It should be noted that any conventional techniques can be used to construct syntax tree node tags for NLP. Indexed text terms 1628 are the output from operation 1602, and primary words 1630 are the output from operation 1608.

The indexed text terms 1628 and the primary words 1630 are fed into the find terms operation 1614. In the given example, the indexed text terms 1628 may be indexed text terms such as "China" and "Population, total", and so on. The primary words 1630 may be nouns such as "China", "India", and "Population". Returning to the example provided above, the indexed text terms 1628 are shown to be the term "Population, total" indexed by words "Population", "total" and referenced to dimension members with corresponding text, the term "Gross domestic product" indexed by words "Gross", "domestic", "product" and referenced to its corresponding dimension members, etc.

The find terms operation 1614 finds terms and sentences based on primary words. For example, given above, the terms "China", "India", "Population, total", and "Population growth, percent" are found as preliminary terms. Thereafter, weights for these preliminary terms are calculated, and the terms are sorted by their associated weight for further processing. In an example embodiment, the terms "China" and "India" may have a preliminary weight bonus ratio, which is taken from a data model trained by a machine learning algorithm, as these terms are fully covered in the trained model (e.g., being elements of an ontology used in the training model. Accordingly, in an example embodiment, the ontology of the trained model may be used in determining the relevance or weight of individual terms identified in the source document. An output from the find terms operation is term set 1632.

The term set 1632 is fed into the add synonyms operation 1616, which accesses a synonym dictionary 1618 to provide an updated term set 1634 that is fed into the transition to series operation 1620. For example, if the user has entered the words "GDP" and USA" in the document zone 202, and these words have thus been included in the syntax tree, the add synonyms operation 1616 will add the term "Gross Domestic Product" for "GDP" and the term "United States of America" for "USA" to the term set 1632 to generate the updated term set 1634. In an example embodiment, experts manually compile one or more customized synonym dictionaries based on uploaded time series dimension members, for instance, simply associating in the GUI "GDP" text term with its synonym "Gross domestic product" text term and optionally specifying synonym relevance percent. It will be appreciated that different data repositories may include different customized synonym dictionaries dependent upon the subject matter upon which the systems and methods are configured to operate. For example, a data repository, and hence a synonym dictionary, may be customized or configured for business applications, sporting applications, geopolitical applications, and so on. For an example geopolitical application, the data repository may include data on agriculture, crime statistics, demographics, education, energy, the environment, foreign trade, health, land use, and so on for various territories or regions of the globe.

The transition to series operation 1620 transitions terms in the updated term set 1634 into a time series of terms and calculates a weight for the time series of terms. In an example embodiment, the weight of a series is based on the following factors: a word weight, word occurrences in series, absent words from a sentence, and terms. Each of these example factors may have a corresponding coefficient from a trained model. Example series with identifying dimension members and their associated weight words are shown in the table below, where '+' and '−' indicates respectively presented and absent in article words and indicates accordingly bonus or penalty for a time series weight. Each word weight may be calculated with a corresponding model coefficient based on its part of speech, frequency in an article, inverted frequency in the time series. Then, the word weight may be involved in the resulting time series weight with a coefficient from the trained model for presented or absent N-grams respectively.

| Region | Indicator | Weight words |
|---|---|---|
| USA | Population, total | −USA + Population − total |
| China | Population, total | +China + Population − total |
| China | Population growth, total | +China + Population − growth − total |

A series set 1636 is output by the operation 1620 and fed into the analyze series by regional members operation 1622. If, for example, a region of time series is not identified in the text of an article then the weight of this time series is reduced by specific coefficient from the trained model. For the example text, the time series "USA Population" weight is reduced by a coefficient for absent regions from the trained model and the time series is finally excluded from the results as the "USA" region not being mentioned in the sample text.

In an example embodiment, the weight for a time series is reduced when the same or similar words are included in the time series data. For the example series above, the weight of time series "China Population growth" may be cut as the time series "China Population" has the same words and a cut ratio coefficient may be also taken from trained model.

An output from the operation 1622 is a series set 1638 that is fed into the analyze series superposition operation 1624. The operation 1624 provides an analyzed series set 1640 to the output by relevance operation 1626.

The output by relevance operation 1626 analyzes the series set 1640 received from the operation 1624 and selects time series data whose calculated weight exceeds a defined threshold that may be also obtained from the trained model. The time series having a weight that exceeds the defined threshold are then grouped by datasets and relevance ranges and, finally, discovered data identifiers of these groups are returned to the client in client readable format, for example, XML or JSON format for SOAP clients. The client, for example a web browser, uses received discovered data identifiers to request actual series data from the server and outputs it for display (e.g., in the related data display zone 208 of the GUI 200).

Figure 17:
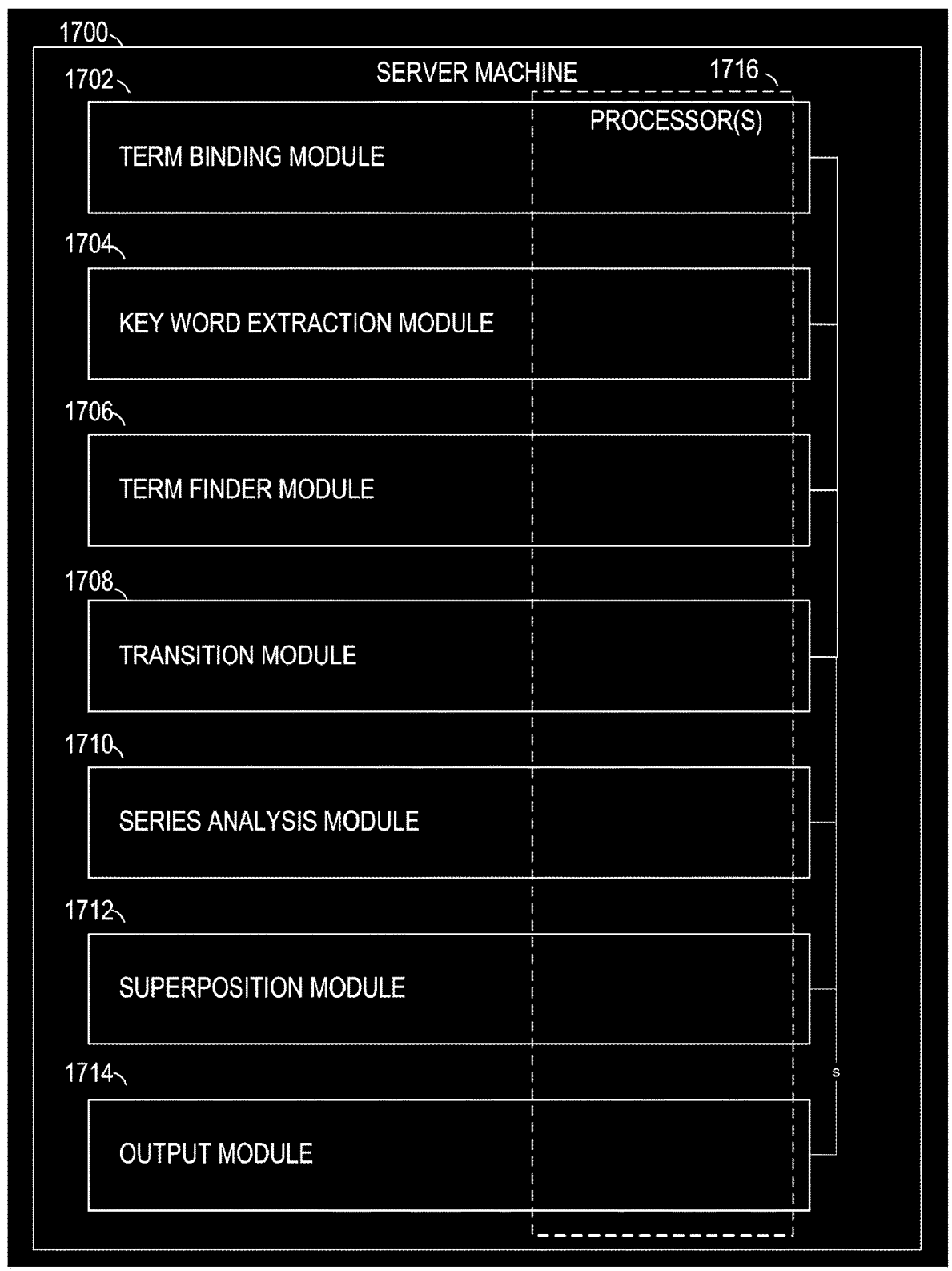
FIG. 17 is a block diagram illustrating components of a server machine, in accordance with an example embodiment, to process a source document and identify data related to the source document.

One or more specially configured hardware modules may perform the operations of the method 1600. FIG. 17 is a block diagram illustrating components of a server machine 1700, in accordance with an example embodiment, configured to process a source document and identify data related to the source document. The server machine 1700 is shown to include a term binding module 1702, a keyword extraction module 1704, a term finder module 1706, a transition module 1708, a series analysis module 1710, a superposition module 1712, and an output module 1714. The modules 1702-1714 execute on one or more processors 1716. In an example embodiment, the modules 1702-1714 execute the operations of the method 1600. More particularly, the term binding module 1702 may perform the functions performed by the bind time series to term definitions operation 1602, the keyword extraction module 1704 may perform the functions of the extract primary words operation 1608, the term finder module 1706 may perform the functions of the find terms operation 1614, and the transition module 1708 may perform the functions of the transition to series operation 1620. Further, the series analysis module 1710 may perform the functions of the analyze series by regional members operation 1622, and the superposition module 1712 may perform the functions of the analyze series superposition operation 1624. The output module 1714 may generate a GUI to provide the resultant information to a user. For example, the output module 1714 may generate a GUI the same as or similar to the GUI 200. It is to be appreciated that one or more of the modules 1702-1714 may be combined and that additional modules performing other functionality may be included in the server machine 1700. In an example embodiment, the server machine 1700 is included in the application servers 140 shown in FIG. 1.

Figure 18:
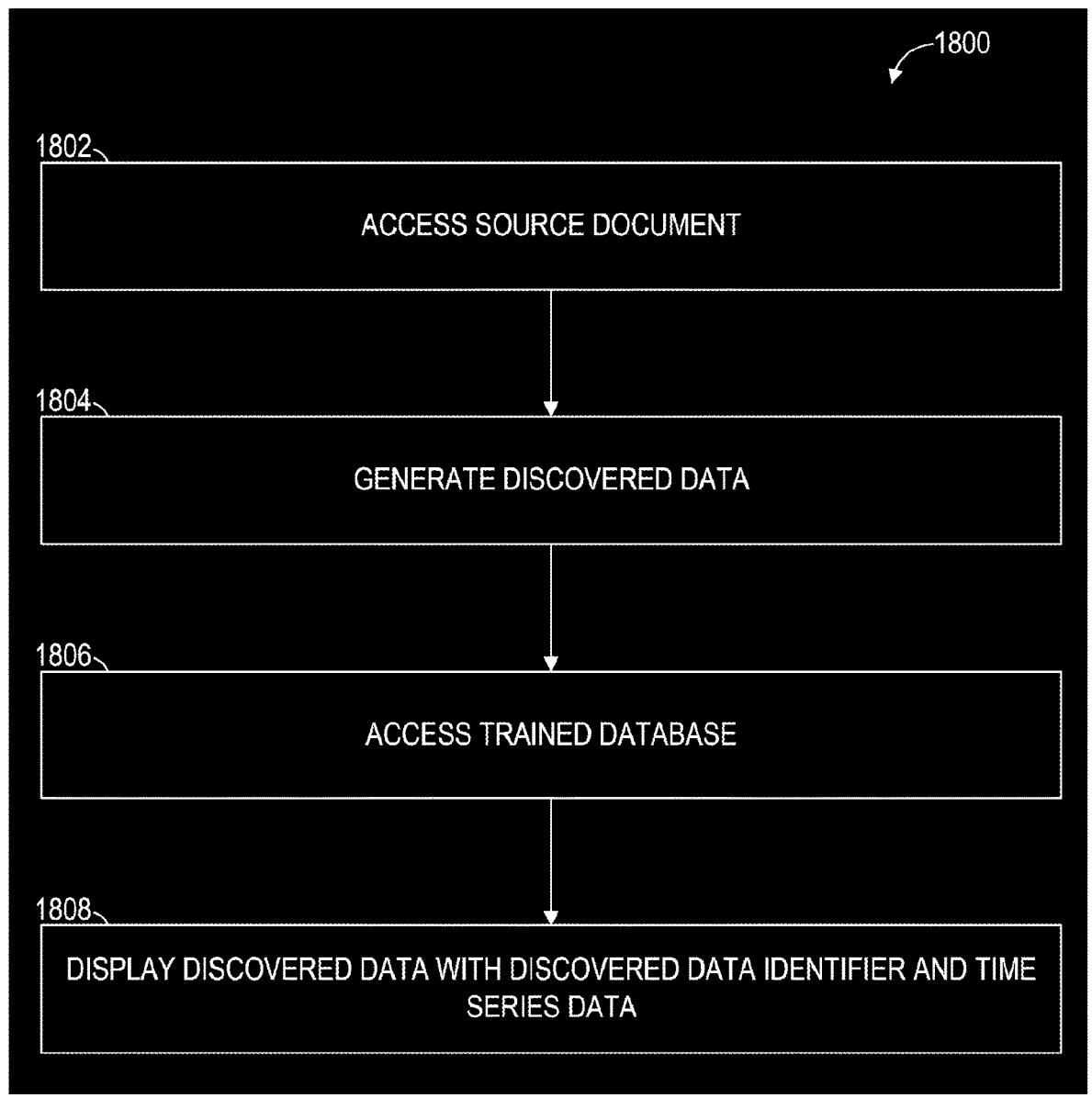
FIG. 18 is a flowchart of a method, in accordance with an example embodiment of providing information related to a source document.

FIG. 18 is a flowchart of a method 1800, in accordance with an example embodiment of providing information related to a source document. The method 1800 may be implemented on the hardware described herein and may incorporate and/or combine any one or more of the methodologies described herein.

As shown at operation 1802, in an example embodiment, the method 1800 accesses, using one or more hardware processors (e.g., the source document 202 shown in FIGS. 2-5, or the source document 606 shown in FIG. 6) that includes numerical data and text. It will be appreciated that the numerical data and the text may be displayed to a user in any GUI of any client device. Thereafter, as shown in operation 1804, using one or more hardware processors (e.g., of the client device 110 or the application server(s) 140), discovered data may be generated (e.g., see the discovered claims 206 shown in the GUI 206). The discovered data may correspond to the numerical data included in the source document. As shown in operation 1806, a database trained with a machine-learning algorithm (e.g., the database(s) 126) may be accessed (e.g., using the database server(s) 124) to identify time series data (e.g., the related data 208 shown in the GUI 200 or the related data 610 shown in the GUI 600) associated with the text. The discovered data, along with a discovered data identifier and the time series related data, are then displayed in the GUI, as shown in operation 1810. As shown by way of example in FIG. 2, the discovered data with the discovered data identifier and the time series related data can be displayed simultaneously with at least a portion of the source document in the GUI 200. Accessing of the source document, generating the discovered data, and accessing the database occur automatically on the fly without user selection.

In an example embodiment, the methods and systems described herein may be implemented in a distributed manner. Accordingly, some of the functionality may be performed server side (e.g., by the application server(s) 140) and some of the functionality may be performed client side (e.g., by the client application(s) 116). Accordingly, in an example embodiment, the source document may be received from the client device (e.g., the client device 110) via a communication network (e.g., the network 104) at a server machine (e.g., the API server 120). Thus, in an example embodiment, accessing the source document, generating the discovered data, and accessing the database may be performed at the server machine and, thereafter, the discovered data with the discovered data identifier and the time series related data may be communicated (e.g., via the network 104) to the client device 110 for display on the client device 110.

As shown, for example, in FIGS. 2-5, the GUI 200 comprises the document zone 202 displaying the source document and a discovered data display zone (e.g., the discovered claims display zone 206) configured to display numerical data. Each item displayed in the discovered data display zone is shown to include a topic identifier 210.1 that serves as the associated discovered data identifier. It should be noted that, in some example embodiments as shown in FIGS. 2-5, the related data display zone can be configured to display the discovered data with the discovered data identifier and the time series related data simultaneously with at least a portion of the source document in the GUI 200.

In an example embodiment, the method 1800, and/or any of the other methods described herein, may parse the source document for key values corresponding to reference values provided in a data repository. As mentioned herein, the GUI 200 may be presented in a web browser and, accordingly, the method 1800, and/or any of the other methods described herein, may comprise providing a plurality of hyperlinks in a webpage associated with the discovered data and the time series related data, monitoring selection of a hyperlink of the plurality of hyperlinks (e.g., using a pointing device such as a mouse or a touch-sensitive screen), and causing the display of further related data upon selection of the hyperlink (e.g., see FIG. 6). The method 1800, and/or any of the methods described herein, can be at least partially performed by a plug-in specially configured to interact with an application displaying the source document. Example source documents include a web browser, a spreadsheet application, a word processing application, an email client, or any GUI presentation engine.

Figure 19:
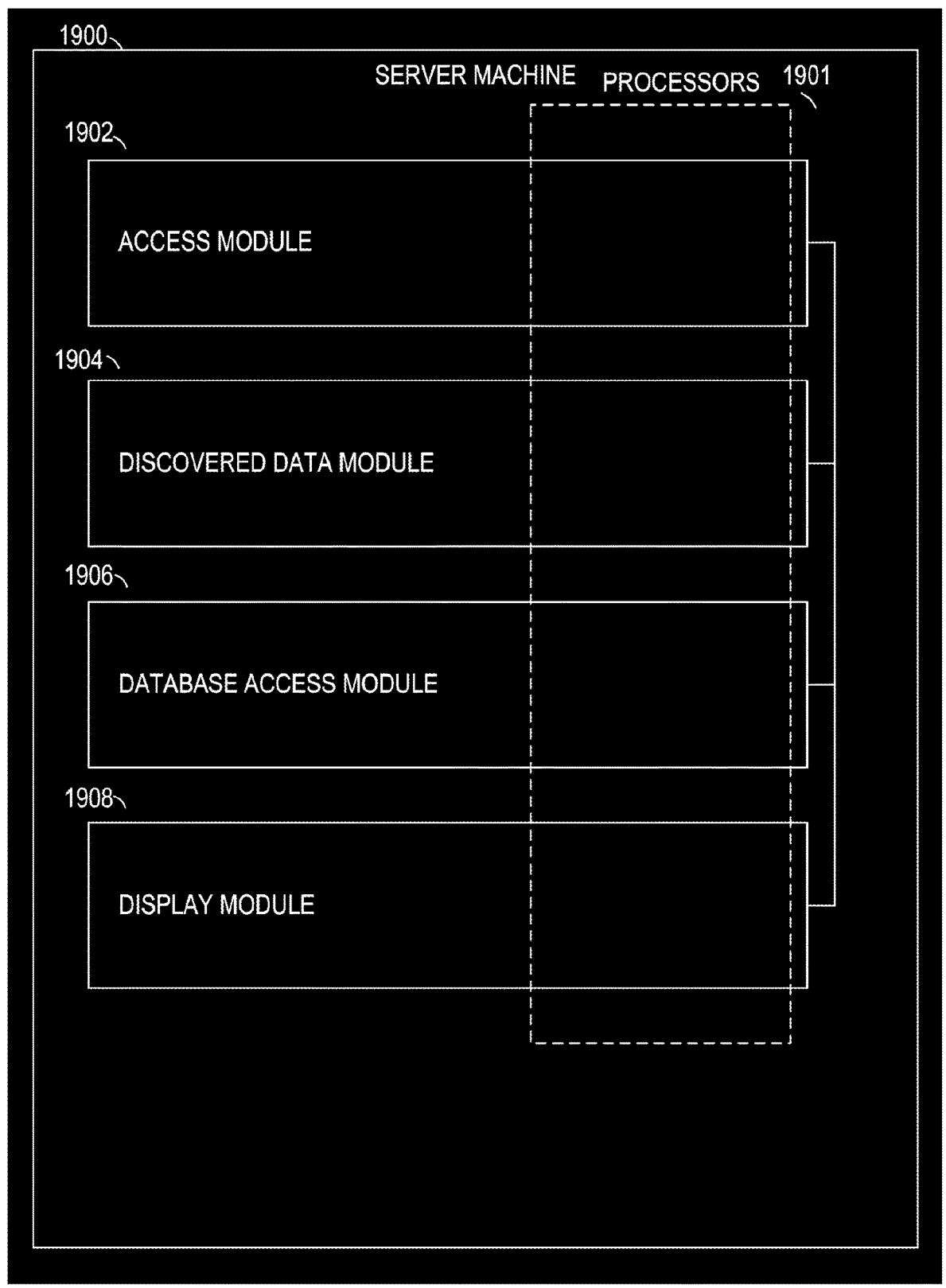
FIG. 19 is a block diagram illustrating components of system, in accordance with an example embodiment, configured to provide information related to a source document.

FIG. 19 is a block diagram illustrating components of system 1900, in accordance with an example embodiment, configured to provide information related to a source document. The system 1900 may implement the method 1800. The system 1900 is shown to include an access module 1902, a discovered data module 1904, a database access module 1906, and a display module 1908. The access module 1902 is implemented by one or more hardware processors 1901 and configured to access the source document including numerical data and text, with the source document displayed to a user in a GUI of a client device. The discovered data module 1904 may be implemented on the one or more hardware processors and configured to generate discovered data, with the discovered data corresponding to the numerical data included in the source document. The database access module 1906 may be implemented on the one or more hardware processors and configured to access a database trained with a machine learning algorithm to identify time series data related data associated with the text. The display module 1908 is configured to cause display of the discovered data with a discovered data identifier and the time series related data in the GUI. Any one or more of the modules 1902-1908 may be implemented by the client application(s) 114 and/or the application server(s)140.

Figure 20:
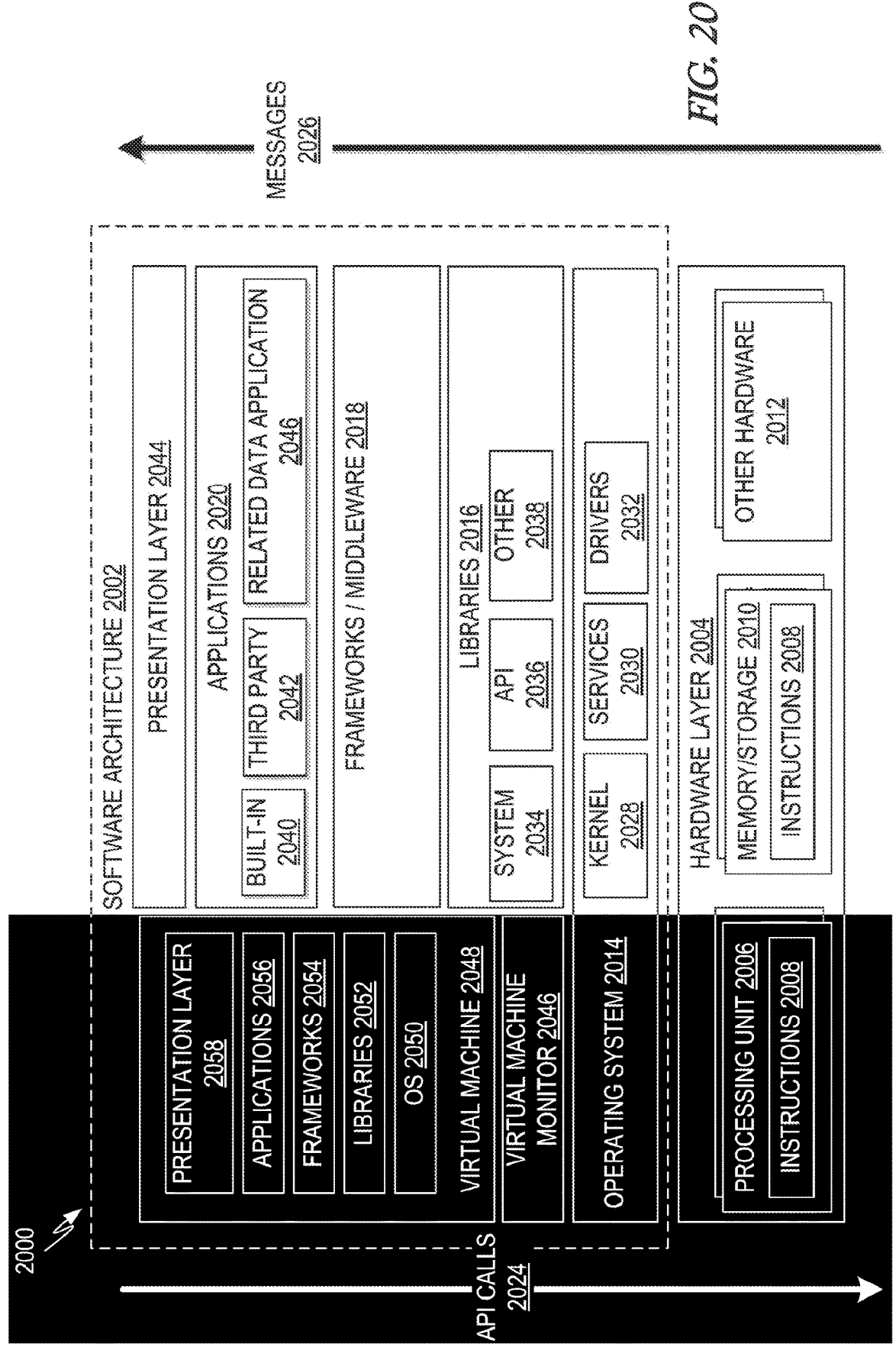
FIG. 20 is a block diagram illustrating an example of a software architecture that may be installed on a machine, according to some example embodiments.

FIG. 20 is a block diagram 2000 illustrating a representative software architecture 2002, which may be used in conjunction with various hardware architectures herein described. FIG. 20 is merely a non-limiting example of a software architecture and it will be appreciated that many other architectures may be implemented to facilitate the functionality described herein. The software architecture 2002 may be executing on hardware such as a machine 2100 (see FIG. 21) that includes, among other things, processors 2110, memory 2130, and I/O components 2150. Returning to FIG. 20, a representative hardware layer 2004 is illustrated and can represent, for example, the machine 2100 of FIG. 21. The representative hardware layer 2004 comprises one or more processing units 2006 having associated executable instructions 2008. The executable instructions 2008 represent the executable instructions of the software architecture 2002, including implementation of the methods, modules, and GUIs of FIGS. 1-19. The hardware layer 2004 also includes memory and/or storage modules 2010, which also have executable instructions 2008. The hardware layer 2004 may also comprise other hardware as indicated by 2012 which represents any other hardware of the hardware layer 2004, such as the other hardware illustrated as part of the machine 2100.

In the example architecture of FIG. 20, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke API calls 2024 through the software stack and receive a response, returned values, and so forth illustrated as messages 2026 in response to the API calls 2024. The layers illustrated are merely representative and not all software architectures have all layers. For example, some mobile or special purpose operating systems may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, flash memory drivers, serial communication drivers (e.g., Universal Serial Bus (USB) drivers), power management drivers, and so forth, depending on the hardware configuration.

The libraries 2016 may provide a common infrastructure that may be used by the applications 2020 and/or other components and/or layers. The libraries 2016 typically provide functionality that allows other software modules to perform tasks in an easier fashion than to interface directly with the underlying operating system 2014 functionality (e.g., the kernel 2028, the services 2030, and/or the drivers 2032). The libraries 2016 may include system libraries 2034 (e.g., C standard library) that may provide functions such as memory allocation functions, string manipulation functions, mathematic functions, and the like, n addition, the libraries 2016 may include API libraries 2036 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks 2018 may provide various GUI functions (e.g., to generate the GUI 200), high-level resource management, high-level location services, and so forth. The frameworks 2018 may provide a broad spectrum of other APIs that may be utilized by the applications 2020 and/or other software components/modules, some of which may be specific to a particular operating system or platform.

The applications 2020 are shown to include built-in applications 2040, third party applications 2042, and related data applications 2046 that perform one or more of the methods described herein. Examples of representative built-in applications 2040 may include, but are not limited to, a contacts application, a browser application, a book reader application, a location application, a media application, a messaging application, and/or a game application. Third party applications 2042 may include any of the built-in applications as well as a broad assortment of other applications. The third party applications 2042 may operate in conjunction with the third party server(s) 130 of FIG. 1.

The applications 2020 may use built in operating system functions the kernel 2028, the services 2030, and/or the drivers 2032), the libraries (e.g., the system 2034, the APIs 2036, and the other libraries 2038), and the frameworks/middleware 2018 to create user interfaces to interact with users of the system. Interactions with a user may occur through the presentation layer 2044.

Some software architectures utilize virtual machines. In the example of FIG. 20, this is illustrated by a virtual machine 2048. A virtual machine creates a software environment where applications/modules can execute as if they were executing on a hardware machine (such as the machine of FIG. 21). The virtual machine 2048 is shown to be hosted by the operating system 2014 and may have a virtual machine monitor 2046, which manages the operation of the virtual machine as well as the interface with the host operating system 2014. A software architecture executes within a virtual machine operating system 2050, libraries 2052, frameworks/middleware 2054, applications 2056, and/or a presentation layer 2058. These layers of software architecture executing within the virtual machine 2048 can be the same as corresponding layers previously described or may be different.

Figure 21:
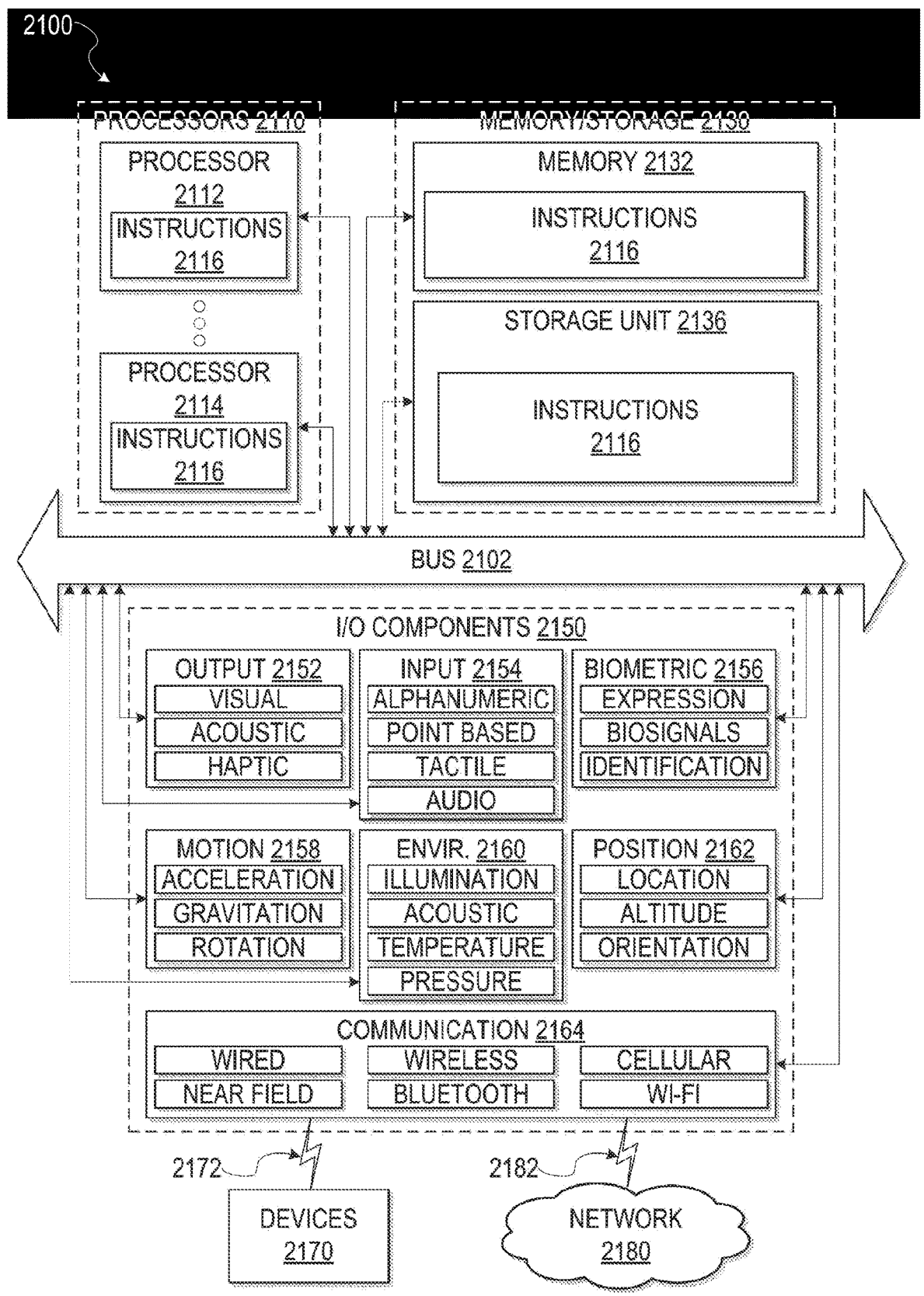
FIG. 21 illustrates a diagrammatic representation of a computer system, in accordance with an example embodiment, within which a set of instructions is executed for causing the machine to perform any one or more of the methodologies discussed herein.

FIG. 21 is a block diagram illustrating components of the machine 2100, according to some example embodiments, able to read instructions from a machine-readable medium (e.g., a machine-readable storage medium) and perform any one or more of the methodologies discussed herein. More specifically, FIG. 21 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example, the instructions may cause the machine to execute the flow diagrams of FIGS. 8, 10, 12, and 15 (and any other functionality described herein). Additionally, or alternatively, the instructions may implement the modules shown in FIGS. 9, 11, and 14 (and any other functionality described herein). The instructions transform the general, non-programmed machine into a particular machine programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a mobile device, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory 2130, and 110 components 2150, which may be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC), another processor, or any suitable combination thereof) may include, for example, processor 2112 and processor 2114 that may execute instructions 2116. The term "processor" is intended to include multi-core processor that may comprise two or more independent processors (sometimes referred to as "cores") that may execute instructions contemporaneously. Although FIG. 21 shows multiple processors, the machine 2100 may include a single processor with a single core, a single processor with multiple cores (e.g., a multi-core process), multiple processors with a single core, multiple processors with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 may include many other components that are not shown in FIG. 21. The I/O components 2150 are grouped according to functionality merely for simplifying the following discussion and the grouping is in no way limiting. In various example embodiments, the I/O components 2150 may include output components 2152 and input components 2154. The output components 2152 may include visual components a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components.

Communication may be implemented using a wide variety of technologies. The I/O components 2150 may include communication components 2164 operable to couple the machine 2100 to a network 2180 or devices 2170 via coupling 2182 and coupling 2172, respectively. For example, the communication components 2164 may include a network interface component or other suitable device to interface with the network 2180. In further examples, communication components 2164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a USB).

Moreover, the communication components 2164 may detect identifiers or include components operable to detect identifiers. For example, the communication components 2164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as, location via Internet Protocol (IP) geo-location, location via Wi-Fi® signal triangulation, location via detecting a NFC beacon signal that may indicate a particular location, and so forth.

In various example embodiments, one or more portions of the network 2180 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1 xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

FIGS. 22 through 26 describe various embodiments for providing a natural language response (e.g., answer) to a natural language query (e.g., question from the end user) using related data. These and other embodiments can be used in implementing an autonomous program, such as a chat bot capable of communicating with end users through various channels (e.g., chat or messenger service, e-mail, etc. For instance, embodiments described herein may be utilized in conjunction with a chat or messenger service, such as one provided by Skype®, Slack®, or Facebook®, which permits an end user to a text-based conversation with a bot during a chat session. The bot may be operating on server (e.g., the application server 140), while the end user may at a client device (e.g., the client device 110) entering their chat session text through the client device. The end user may chat with the bot as if they are a real human and ask the bot various data-related questions, such as "What is oil production of Nigeria?" or "What data do you have on Mexico?" While the bot engages in such conversations, various embodiment described herein can enable the bot to: translate a natural language query (e.g., a question posed by the end user) into structure intents that comprise high-level requests for data related to the natural language query; fetch related data (e.g., time series data) from a data repository according to those requests; and then convert the related data fetched into a natural language response. Using various embodiments can enable a bot to implement, for example, a digital research assistant or automated customer technical support.

The following table illustrates some example conversations with a bot enabled by an embodiment described herein. In the examples, "U" represents text from an end user and "B" represents text from the bot.

| Example Conversation | Dialog |
|---|---|
| 1 | U: What is oil production of Nigeria? <br> B: In 2014 Production of Crude Oil for Nigeria was 2,423.21 Thousand Barrels Per Day. <br> B: http://knoema.com/atlas/Nigeria/topics/Energy/Oil/Production-of-Crude-Oil <br> B: Production of crude oil of Nigeria improved by 2.36% from 2,367.37 thousand barrels per day in 2013 to 2,423.21 thousand barrels per day in 2014. Since the 1.19% downward trend in 2012, production of crude oil went down by 3.84% in 2014. <br> B: Would you like to learn more? [Yes\|No] <br> U: Yes <br> B: In 2014, production of crude oil in Nigeria was 2,423.21 thousand barrels per day that is 3.84% lower compared to the previous year. In the ranking by production of crude oil including 189 countries, Nigeria has the 12 rank that is close to the positions of such countries as Mexico and the Brazil. Compared to Russian Federation which at the top of the ranking with production of crude oil of 10,107.09 thousand barrels per day in 2014, Nigeria has 76.02% percent lower production of crude oil. <br> B: Would you like me to brief you on the related indicators? [Yes\|No] <br> U: Yes <br> B: [Oil Supply \| Exports of Crude Oil \| More] <br> U: Exports of Crude Oil <br> B: In 2012 Exports of Crude Oil for Nigeria was 2,115.00 Thousand Barrels Per Day. |
| 2 | U: What data do you have on Mexico? <br> B: President: Enrique Peña Nieto <br> President of the Senate: Roberto Gil Zuarth <br> Capital city: Mexico City (Distrito Federal) <br> Languages: Spanish only 92.7%, Spanish and indigenous languages 5.7%, indigenous only 0.8%, unspecified 0.8% note: indigenous languages include various Mayan, Nahuatl, and other regional languages (2005) <br> Population: 127,017,224 <br> Area: 1,943,950 <br> GDP per capita: 9,009 <br> GDP, billion current US$: 1,144.3 <br> GINI index: 48.21 <br> Ease of Doing Business rank: 47 <br> B: Also I have data on the following areas: [Economy \| Energy \| more] <br> U: Energy <br> B: In 2012 Total primary energy production for Mexico was 8.71 Quadrillion Btu. <br> B: http://knoema.com/atlas/Mexico/Total-primary-energy-production |

-continued

| Example Conversation | Dialog |
|---|---|
| | B: Total primary energy production of Mexico declined by 1.73% from 8.87 quadrillion btu in 2011 to 8.71 quadrillion btu in 2012, Since the 2.49% improve in 2010, total primary energy production declined by 1.33% in 2012.<br>B: Would you like to learn more? [Yes\|No] |
| 3 | U: What data do you have on energy?<br>B: China is being the top country by total primary energy production in the world. As of 2012, total primary energy production in China was 101.78 quadrillion btu that accounts for 18.95% of the world's total primary energy production. The top 5 countries (others are the United States of America, Russian Federation, Saudi Arabia, and Canada) account for 52.70% quadrillion btu of it. The world's total primary energy production was estimated at 537.16 quadrillion btu in 2012.<br>B: Also I can brief you on the following indicators: [Total primary energy production \| Energy intensity \| more]<br>U: total primary energy production<br>B: In 2012 total primary energy production for China was 101.78 Quadrillion Btu. |

Various embodiments described herein may utilize an ontology in performing certain operations. As used herein, an ontology can include a graph of semantic concepts (e.g., terms) that indicate relationships between each semantic concepts and mappings from semantic concepts to the data in a data repository. In this way, an ontology can be regarded as a semantic or concept map. As used herein, related data with respect to a natural language query can include a dataset or time series (e.g., from the data repository) that is relevant to the natural language query.

Figure 22:
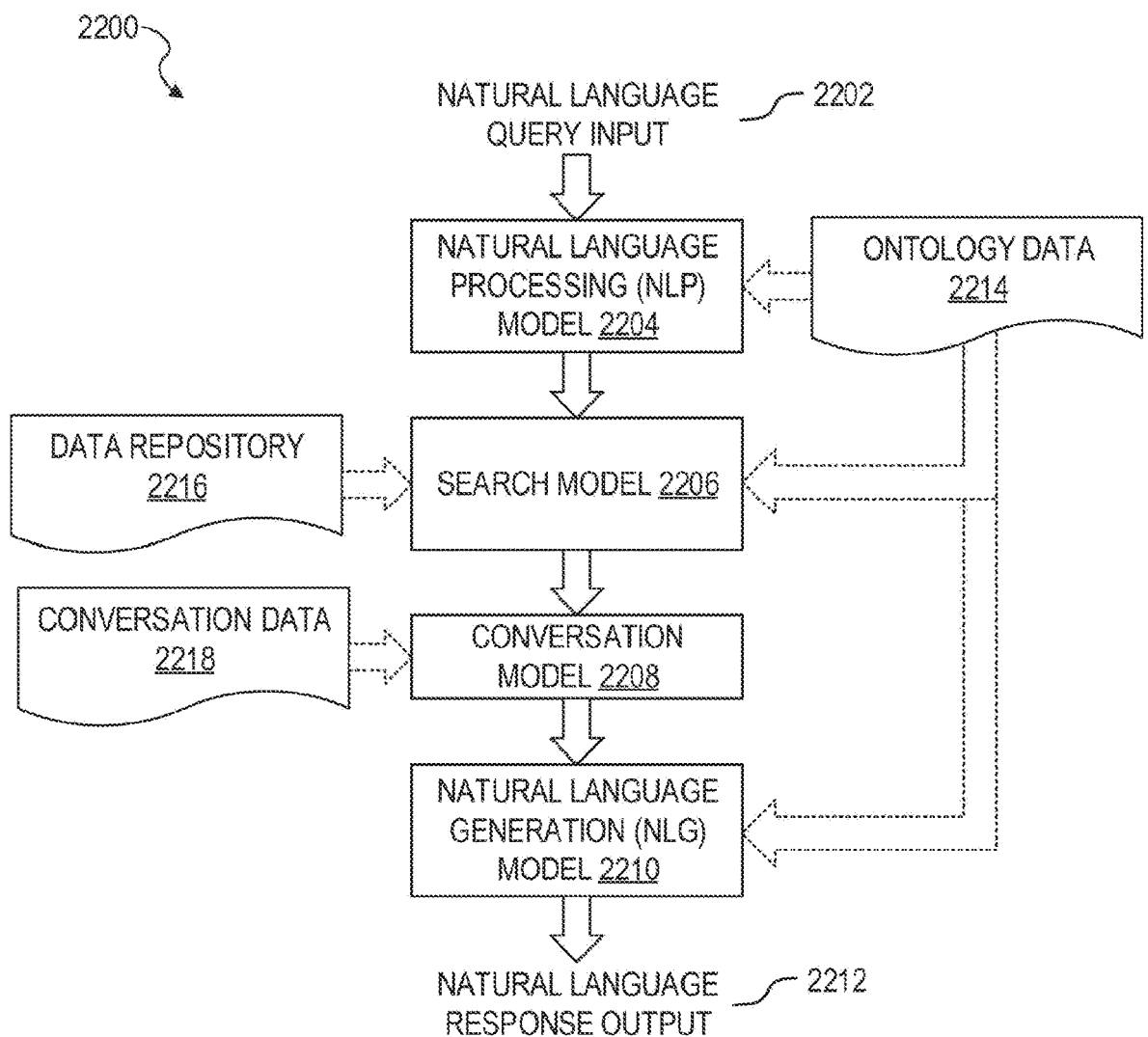
FIG. 22 is a flowchart of a method, in accordance with an example embodiment, for providing a natural language response to a natural language query.

FIG. 22 is a flowchart of a method 2200, in accordance with an example embodiment, for providing a natural language response to a natural language query. In particular, the method 2200 illustrates an overview of various embodiments provide a natural language response output 2212 to a natural language query 2202 using a natural language processing (NLP) model 2204, a search model 2206, a conversation model 2208, and a natural language generation (NLG) model 2210.

According to various embodiments, the natural language processing (NLP) model 2204 comprises a set of structured intents that assist in understanding intent of a particular natural language query (e.g., end user question) received from an end user. The set of structured intents may be extensible such that new structured intents can be added, thereby permitting a bot implementing an embodiment to respond to new types of natural language queries. For some embodiments, a structured intent comprises a structured representation of a natural language query (e.g., end user question). A structured intent can assist in resolving ambiguities that may occur when similarly structured natural language queries (e.g., end user questions) have totally different meaning depending on semantics. Every structured intent can be expressed by a set of different phrases. For instance, the production of oil in Nigeria may be requested using any of the following example questions:
 What is oil production of Nigeria?
 Oil production of Nigeria.
 How big is the production of oil in Nigeria?
 How much oil was produced in Nigeria?
The NLP model 2204 can be utilized to identify a set of structured intents that match the natural language query 2202. More than one structured intent may be identified if ambiguity remains with respect to which structured intent matches the natural language query 2202. For some embodiments, the NLP model 2204 utilizes ontology data 2214 (e.g., class and concept data from the ontology data 2214) to identify a set of structured intents associated with the natural language query 2202. The ontology data 2214 can be used by various embodiments to define or describe an ontology, which may comprise classes, subclasses, and concepts (e.g., concept names and their aliases) that fall within a class or subclass.

For some embodiments, the search model 2206 (e.g., trained by the search model training operation 806) receives a set of structured intents identified by the NLP model 2204. Along with the set of identified intents, the NLP model 2204 may provide a set of concepts extracted from the natural language query 2202 based on the set of identified structured intents. The search model 2206 can utilize the set of identified structured intents and the set of concepts extracted by the NLP model 2204 to identify, within the data repository 2216, data that is related and relevant to the natural language query 2202. The ontology data 2214 can be utilized by the search model 2206 to identify data related and relevant to the natural language query 2202.

For various embodiments, the conversation model 2208 is utilized to track a context of a conversation between a bot and an end user based on conversation data 218 relating to the conversation. The context provided by the conversation model 2208 may be utilized by the NLP model 2204 to resolve (or assist in resolving) ambiguity when identifying a set of structured intents that match the natural language query 2202. The context provided by the conversation model 2208 may be utilized by the search model 2206 to resolve (or assist in resolving) ambiguity when identifying data that is related and relevant to the natural language query 2202.

For some embodiments, the NLG model 2210 comprises a set of natural language response templates utilized to convert data identified by the search model 2206 to a natural language response. The NLG model 2210 may utilize the ontology data 2214 to identify which natural language response template(s) to use for the identified data. According to some embodiments, each identified natural language response template defines a response to be used and where the identified data will be inserted into the response.

Figure 23:
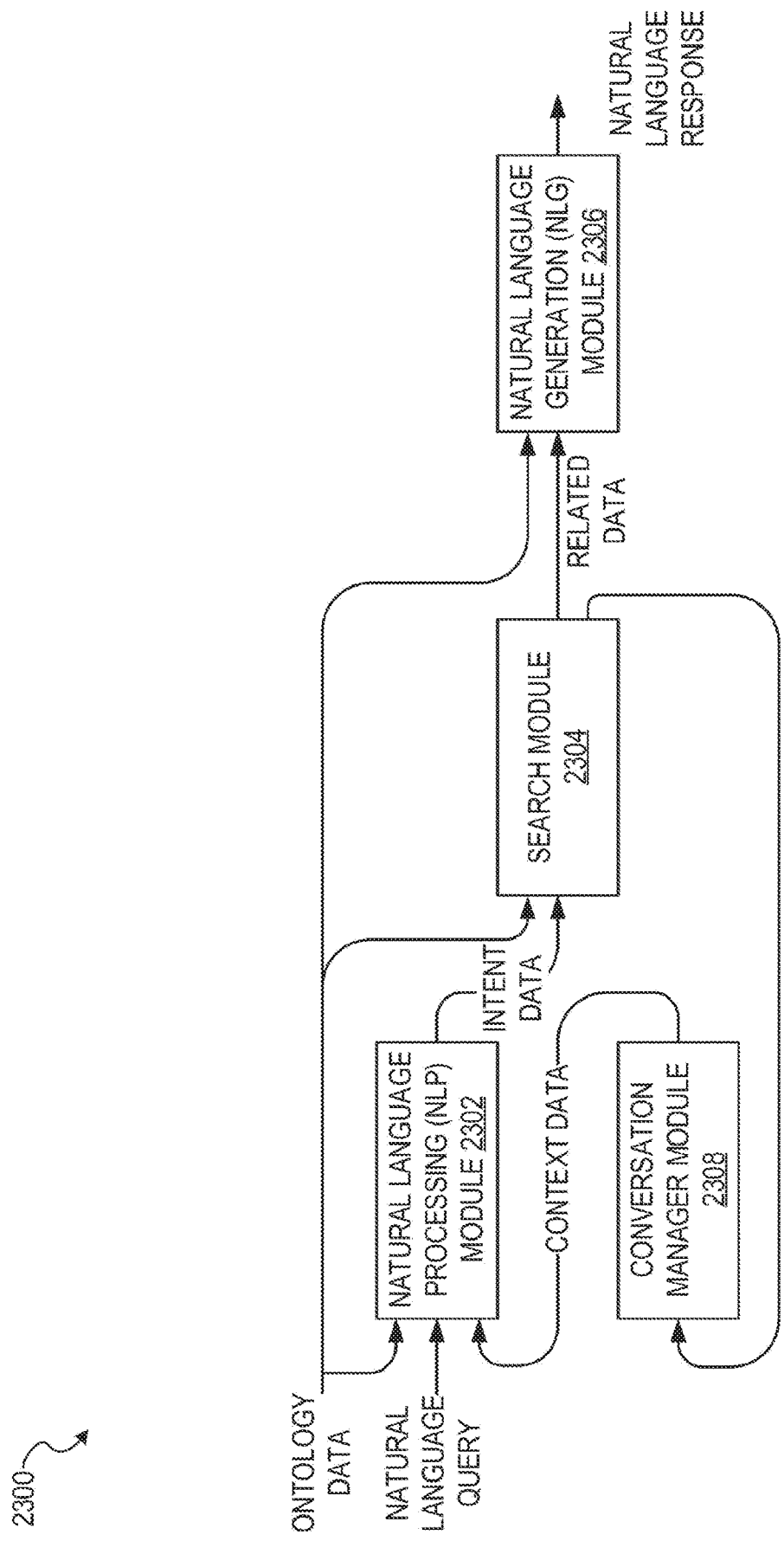
FIG. 23 is a flowchart of a method, in accordance with an example embodiment, for providing a natural language response to a natural language query.

FIG. 23 is a flowchart of a method 2300, in accordance with an example embodiment, for providing information in response to a natural language query. The method 2300 may be implemented by one or more of the application server(s)

Figure 24:
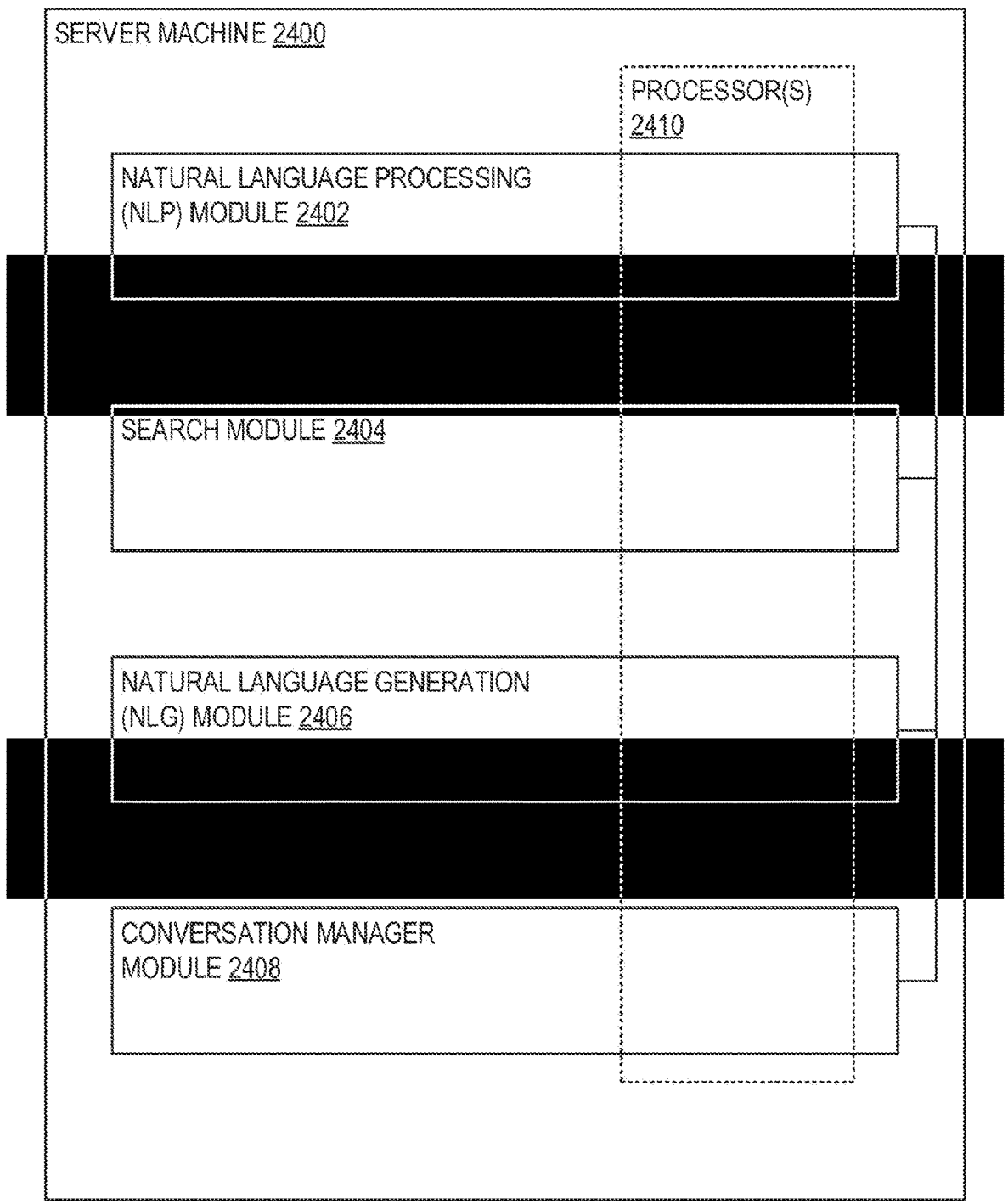
FIG. 24 is a block diagram illustrating components of a server machine, in accordance with an example embodiment, configured to provide a natural language response to a natural language query.

140 (see in FIG. 1) and, accordingly, is described merely by way of example with reference thereto. More particularly, example components of a server machine are shown in FIG. 24. The server machine 2400 is shown to include a natural language processing (NLP) module 2402, a search module 2404, a natural language generation (NLG) module 2406, and a conversation manager module 2408. The modules 2402-2408 may execute on one or more processors 2410. As method 2300 may be performed by the server machine 2400, it is described merely by way of example with reference thereto.

Returning to FIG. 23, the method 2300 is shown to include a natural language processing (NLP) module 2302, a search module 2304, a natural language generation (NLG) module 2306, and a conversation manager module 2308. In the example method 2300, the NLP module 2302 receives a natural language query (e.g., end user question) and translate the natural language query to a set of structured intents. As noted herein, the NLP module 2302 can resolve ambiguities that may occur when similarly structured natural language queries (e.g., end user questions) have different meaning depending on semantics. The NLP module 2302 may utilize a NLP model (e.g., the NLP model 2204) that comprise a set of structured intents. According to some embodiments, a given structured intent is represented by a set of different natural language query phrases. As used herein, an utterance can correspond to a set of different natural language query phrases. For some embodiments, an utterance is defined by an utterance template with delineated fields. Each delineated field can, for example, correspond to different regions or indicators in a natural language query phrase. For some embodiments, each structured intent is associated with a set of utterances, and a given utterance is associated with a given structured intent. A particular, natural language query phrase can be matched to several utterances because of ambiguity in natural language. For instance, text "Real GDP" included in a natural language query phrase may be matched to an utterance "{indicator}" and to an utterance "{region} {indicator}," given that "Real" is also a region (municipality) in Spain. These and other sorts of ambiguities can be resolved by the search module 2304 as described herein.

A given utterance template may, for example, comprise a set of words to be matched against corresponding words of a natural language query, and a set of delineated fields (e.g., delineated by curl brackets) that each contain a name of a class from an ontology to be matched against a corresponding word of the natural language query to determine if the corresponding word names a concept that is included by the class. Example utterance templates may define an utterance as follows: "What is {indicator} of {region}?"; "{indicator} of {region}"; "How big is the {indicator} in {region}?"; and "How much {indicator} in {region}?". In these examples, {indicator} can specify an "indicator" class to match against a corresponding word or sequence of words in the natural language query to determine if the corresponding word names a concept that is a member of the "indicator" class or one of its subclasses. {region} can specify an "region" class to match against a corresponding word in the natural language query to determine if the corresponding word names a concept that is a member of the "region" class. A concept may have one or more words in its name. Additionally, a class may comprise one or more levels of subclasses. For instance, a "region" class may have a subclass "country" that includes the concept of "United States," and the concept "United. States" in a natural language query may correspond to {country} subclass and to a {region} class.

An example ontology may comprise the following classes: region; indicator; unit; named entity; and attribute. Example concept members of region can include, without limitation, China or California. Example concept members of indicator can include, without limitation, gross domestic product (GDP), population, and revenue. Example concept members of unit can include, without limitation, US dollar and percentage ("%"). Example concept members of named entity can include, without limitation, oranges, aluminum, and Microsoft. Example concept members of attribute can include, without limitation, per capita, male, and female. It will be appreciated that for various embodiments, classes and concepts of an ontology can vary from these examples.

For some embodiments, an ontology comprises a set of classes, each of which can have subclasses. For instance, a "Region" class can have a "Country" subclass. For various embodiments, a set of concepts (e.g., concept names and their aliases) fall within a class or subclass. Each concept can have a name and can have a set of alternative names (e.g., aliases). For instance, the concept of 'United States' can have the alternative names of 'US', 'USA', and 'United States of America.' The set of alternative names may be utilized by various embodiments to deal with synonyms in natural language. Each concept may have a link or mapping to a dimension member in a data repository (e.g., the database(s) 126), which permits identification of data that is relevant to a particular concept.

According to various embodiments, a match between an utterance and a natural language query involves matching words of an utterance template (associated with the utterance) with corresponding words of the natural language query, and matching every delineated field (e.g., curly bracketed field) that names a class (of an ontology) to a corresponding concept named in the natural language query. A name of a class can match a name of a concept if the class (or its subclass) named includes the concept named. In this way, the same utterance may be used to describe a set of similar natural language response for different concepts within the same class (e.g., different countries and indicators). As noted herein, for some embodiments, an utterance and its associated utterance template are associated with a given structured intent. Accordingly, a given utterance matching a given natural language query can result in identification of a structured intents for the given natural language query by the NLP module 2302. Additionally, for some embodiments, more than one utterance and its associated utterance template can match a given natural language question, which can also result in identification of a plurality of structured intents for the given natural language query by the NLP module 2302. Ambiguity in identifying a set of structured intents for a given natural language query can involve looking for ambiguous parts in an ontology and selecting the set of structured intent with matching semantics.

The following table illustrates some example structured intents, their associated utterances (as defined by an utterance template), and matching natural language queries (e.g., end user questions).

| Example Number | Example |
| --- | --- |
| 1 | Natural Language Query: What is oil production of Nigeria?<br>Utterance Template: What is {indicator} of {country}?<br>Structured Intent with matched concepts:<br>{<br>    Intent: "Country IndicatorInfo",<br>    Country: "Nigeria",<br>    Indicator: "Oil production"<br>} |
| 2 | Natural Language Query: What data do you have on Mexico?<br>Utterance Template: What data do you have on {country}?<br>Structured Intent with matched concepts:<br>{<br>    Intent: "CountryInfo"<br>    Country: "Mexico"<br>} |
| 3 | Natural Language Query: What data do you have on energy?<br>Utterance Template: What data do you have on {topic}?<br>Structured Intent with matched concepts:<br>{<br>    Intent: "TopicInfo"<br>    Topic: "Energy"<br>} |
| 4 | Natural Language Query: How big was wine production in France?<br>Utterance Template: How big was {timeseries}?<br>Structured Intent with matched concepts:<br>{<br>    Intent: "TimeseriesInfo",<br>    Country: "France",<br>    Crop: "Wine",<br>    Indicator: "Production quantity"<br>} |

The example structured intents illustrated above include various delineated fields, such as {indicator}, {country}, {topic}, and {timeseries}. With respect to the {timeseries} delineated field, the delineated field is matched when corresponding words from natural language query coincide with the name of some time series data. The name of a time series data may comprise a sequence of one or more concept names.

For some embodiments, the NLP module 2302 matches a natural language query (e.g., end user question) to an utterance template associated with an utterance. Depending on the embodiment, the NLP module 2302 may perform this match operations across a plurality of utterance templates to identify the first matching utterance template (e.g., to identify any structured intents for the natural language query) or to identify all matching utterance templates (e.g., to identify all possible structured intents for the natural language query). Matching of the natural language query to the utterance template by the NLP module 2302 may be accomplished processing words from the natural language query and the utterance template and checking for a set of partial match conditions. A method for matching a natural language query to a selected utterance template is illustrated and described with respect to FIG. 26.

The following table illustrates an example set of partial match conditions checked for each word of a natural language query (e.g., by the NLP module 2302) when matching the natural language query to a given utterance template.

| Example Number | Example Partial Match Condition |
| --- | --- |
| 1 | If the current word from the natural language query is the same as the current word in the utterance template, then proceed to the next word in the natural language query and in the utterance template. |
| 2 | If the current word from the natural language query is the start of a concept name (or an alternative name for a concept), then check whether words that follow the current word in the natural language query coincide with words of the concept name.<br>If the current word and words that follow it in the natural language query coincide with the words of a concept name, then a concept is considered identified and all ancestors of the identified concept are determined.<br>If the current word in the utterance template is a class name in a delineated field (e.g., within curly brackets) and the named class is among the ancestors of the identified concept, then initialize a corresponding variable in the structured intent by identified concept, proceeding to the next word of the natural language query (past the concept name), and proceeding to the next word of the utterance template (past the delineated field). |
| 3 | If the current word from the natural language query does not match the current word in the utterance template, then the current word in the natural language query or the current word in the utterance |

| Example Number | Example Partial Match Condition |
|---|---|
| | template can be skipped. The following can implement the skip the current word in an utterance template or a natural language query.<br>a) A degree of certainty in the match is decreased by a value based on:<br>whether the current word is in a list of unimportant words (e.g., decrease in certainty is small for such words);<br>whether the current word is a part of a concept name in the utterance template or the natural language query (e.g., decrease in certainty is very big for such words);<br>part of speech of the word; and<br>other possible features of the current word.<br>b) If the degree of certainty in the matching is below a predefined threshold value, then discard the partial match (and move to next utterance template if available).<br>c) If the degree of certainty in the matching is above the predefined threshold value, skip the current word in the utterance template or in the natural language query. |

For some embodiments, when any partial match condition (e.g., any one of those listed in the table above) is satisfied, a new partial match is created. More than one partial match at every word can be created. For instance, a given word in the natural language query may be viewed as part of concept name and as unimportant word. If none of the partial match conditions for a given word of the natural language query and a partial match currently exists (based on previous words of the natural language query satisfying for partial match conditions), then the partial match may be discarded. If the end of the natural language query is reached and it coincides with the end of the utterance template, then a partial match can be considered a complete match. In this way, a natural language query can be matched to different utterance templates or to a given utterance template in different ways.

For some embodiments, the process for matching a natural language query to a set of utterance templates is sped up by matching similar prefixes of different utterance templates to the natural language query only once. This may be achieved by combining similar beginnings of different utterance templates together.

As noted herein, the NLP module 2302 may match a plurality of utterance templates to the natural language query. For various embodiments, the set of utterance templates considered to match the natural language query may be filtered to include only those utterance templates that match the natural language query above a pre-determined level of certainty (e.g., a certainty threshold determined by the NLP module 2302 based on the partial match conditions). If the NLP module 2302 determines that there are several best matches (e.g., those having the highest level of certainty) with close certainty and an ontology (received by the NLP module 2302 as ontology data) does not assist in resolving ambiguity between those best matches, then the NLP module 2302 may consider all of the best matches to be the final set of matching utterance templates. This final set of matching utterance templates may be passed to the search module 2304 as a set of structured intents that are associated with those matching utterance templates. In this case, ambiguity may be resolved by the search module 2304 or with a help of results from the search module 2304, as explained below with respect to search module 2304. If no matches have been made between the natural language query and an utterance template, or the certainty of the best match or matches are not high enough (e.g., do not meet or exceed a minimum certainty threshold), the natural language query may be passed to a human data analyst to provide the natural language response to the natural language query. The natural language response provided by the human data analyst may be stored with the natural language query for future model training, or for analysis by another human data analyst looking to improve the model.

For some embodiments, the NLP module 2302 identifies a set of structured intents for the natural language query based on the association of those structured intents to the set of utterance templates determined (by the NLP module 2302) to match the natural language query. In particular, the set of structured intents identified may correspond to those associated with the matching utterance templates. For some embodiments, the NLP module 2302 passes a set of structured intents identified for the natural language query to the search module 2304 (e.g., as intent data including identifiers for the set of structured intents) for further processing. Included with the set of structured intents, the NLP module 2302 may pass a corresponding set of concepts (e.g., concept names) extracted from the natural language query based on the set of structured intents identified by the NLP module 2302.

In the example method 2300, the search module 2304 uses a structured intent associated with a natural language query (e.g., end user question) to identify, from a data repository (e.g., the database(s) 126), data related and relevant to the structured representation of the question. For some embodiments, the search module 2304 comprises the search module 910 described above with respect to FIG. 9, which may be trained by the search training module 906 described above with respect to FIG. 9.

For some embodiments, the search module 2304 receives the set of structured intents identified by the NLP module 2302, which may be accompanied by a corresponding set of concepts (e.g., concept names) extracted from the natural language query based on the set of structured intents identified by the NLP module 2302. Alternatively, the search module 2304 may perform extraction of the set of concepts from the natural language query based on the set of structured intents received from the NLP module 2302. Based on the set of concepts, the search module 2304 may identify a set of dimension members relevant to the set of concepts, may identify data in a data repository (e.g., trained by machine learning) related and relevant to the set of identified dimensions (e.g., time series data), and may select the related data that reflect the best search results.

According to some embodiments, the search module 2304 identifies a set of dimension members relevant to a set of concepts extracted from the natural language query by finding the set of dimension members linked or associated with each of the concepts in the set of concepts. As described herein, the link between a given concept and a set of dimension members may be maintained by an ontology. The search module 2304 may then analyze each of the identified dimension members and, if all the concepts (e.g., all nonoptional concepts) are present in one of the structured intents in the set of structure intents (e.g., received from the NLP module 2302), then the identified dimension member is considered relevant. For some embodiments, certain concepts (e.g., unit) may be considered optional at least for dimension relevance purposes.

According to some embodiments, the search module 2304 identify data in a data repository (e.g., trained by machine learning) related and relevant to the set of identified dimension members by identifying data within the data repository associated to all the dimension members identified by the search model 2304 as relevant. For instance, time series data in the data repository may be identified as related and relevant if all the dimension members associated with the time series data in the data repository match the set of dimension members identified by the search module 2304. For example, time series data on "United States-GDP" may have two associated dimension members—"United States" and "GDP"—within the data repository. This time series data on "United States-GDP" may be determined related and relevant to the natural language query if the dimension members of "United States" and "GDP" are relevant to the natural language query. There may be other dimension members from other datasets relevant to the natural language query dimension members, however it is not necessary for the time series data to be associated to those other datasets to be related and relevant to the natural language query.

As noted herein, dimensions associated with optional concepts may not be considered relevant and, thus, not relevant for identifying related data in the data repository relevant to the natural language query. For some embodiments, the data identified comprises time series data related and relevant to the natural language query. Various embodiments can achieve disambiguation of a natural language query by the search module 2304 because there is a high probability that an incorrect interpretation of the natural language query would result in the search module 2304 not identifying data (e.g., time series data) in the data repository related and relevant to the natural language query.

Based on data identified by the search module 2304 as being related and relevant to the natural language query, for some embodiments, the search module 2304 selects the best search results by evaluating the identified data under a set of filter parameters. The selection of factors may be used to order/rank the identified data according to best results. The set of filter parameters can include, for example, relevance between concepts and dimensions (e.g., dimension members), quality of source providing the identified data, and (where applicable) quality of time series data. With respect to relevance between concepts and dimensions, the search module 2304 evaluate the quality or number of links between relevant concepts extracted from the natural language query and relevant dimensions identified by the search module 2304. For example, each links can comprise a degree of certainty of relevance between a concept and a dimension. For instance, time series data, associated with a set of relevant dimensions identified by the search module 2304, may be determined to have lower relevance if there is a lower certainty in the link between relevant concepts extracted from the natural language query and the associated set of relevant dimensions. Additionally, the presence of a set of optional concepts in a dimension (e.g., dimension member) that are present in the set of structured intents (e.g., identified by the NLP module 2302) can decrease the relevance of data identified by the search module 2304 in associated with the dimension.

With respect to the quality of a source providing data identified by the search module 2304 (e.g., data source quality), the search module 2304 may consider sources that provide data having more views or that are regularly updated to be higher quality sources of data. For instance, time series data related to world statistics may be taken from dataset provided by different sources, such as the IMF (International Monetary Fund) or WB (World Bank). Data identified by the search module 2304 and provided by higher quality sources of data may be considered as better more relevant or makes for the best result). With respect to quality of time series data, the search module 2304 may consider time series data that covers a longer period of time to be better than time series data that covers a short period of time. Additionally, the search module 2304 may consider time series data for later date to be better than time series data that does not include the latest data available.

For some embodiments, the search module 2304 provides the data identified by the search module 2304 to the NLG module 2306 as related data, which may comprise data considered by the search module 2304 to be the best results of data identified (e.g., searched within the data repository) by the search module 2304.

In the example method 2300, the NLG module 2306 transforms the data identified by the search module 2304 (as related and relevant to the structured intent associated with the natural language query) into a natural language response. In this way, the NLG module 2306 generates a natural language response to a natural language query based on data identified by the search module 2304. For some embodiments, the NLG module 2306 utilizes a NLG model (e.g., the NLG model 2210) that includes a set of natural language response templates for structuring a natural language response based on data identified by the search module 2304.

For some embodiments, a natural language response template comprises text that indicates where predefined variables (e.g., delineated variables) are to be used within the natural language response template, such as predefined variables {region}, {indicator}, {date}, {value}, and {unit}. The set of predefined variables may depend on a structured intent to which the natural language response template is associated. Pre-defined variables, such as {region} and {indicator}, may be initialized during structured intent matching by the NLP module 2302. Additionally, the predefined variables based on related data (e.g., {date}, {unit}, {value}, {prevDate}, etc.) may be initialized after related data is received from the search module 2304. The NLG module 2306 may rely on a set of rules to determine the applicability of a particular natural language response template.

For various embodiments, the NLG module 2306 selects a particular natural language response template based a set of selection factors. Upon selection of a natural language response template, the NLG module 2306 can replace predefined variables mentioned in the selected natural language response template with data from the related data provided by the search module 2304. The mentioned predefined variables may also be replaced by a concept identified (by the NLP module 2302) in the natural language query.

An example selection factor can include a set of structured intents identified by the NLP module 2302. For some embodiments, this set of structured intents includes only one structured intent, as all disambiguates of the natural language are resolved by this stage. Different structured intents may be associated with different natural language response templates. A particular structured intent may be associated with a set of natural language response templates available for selection by the NLG module 2306. The set of natural language response templates is extensible, and new natural language response templates can be added to the set to better describe related data identified by the search module 2304.

Another example selection factor can include related data provided by the search module 2304, where a set of rules associated with a natural language response template depends on the related data. For instance, where the related data comprises time series data, if the time series data for last several dates the difference between a value for some particular date and a value for a previous date is less than zero, then a natural language response template with a description of downward trend may be used. Similarly, if other trends are observed by the NLG module 2306 in the related data (e.g., upward trends, stability, a U-turn trend, etc.), an appropriate natural language response template can be selected accordingly.

Another example selection factor can include ontology (e.g., ontology data), where different concepts can have different properties associated with them, and the applicability of a natural language response template can depend on those properties. For instance, a GDP indicator can have the property of being aggregable (e.g., sum of GDP of all countries has meaning as world GDP and percent of particular country in the world GDP also has). In this example, a natural language response template selected by the NLG module 2306 may comprise the following: "As of {date}, {indicator} in {region} was {value} {unit} that accounts for {percentOfParent} of {parentRegion}'s {indicator}." The selection of this example natural language response template may not be appropriate for usage with such indicators as "crop yield" or "GDP growth."

Another example selection factor can include a random number generation, whereby a natural language response template is selected from a plurality of appropriate natural language response templates (e.g., that satisfy all the other selection factors). The natural language response template selected and used may be based on a random number. Additionally, in this way, a bot including an embodiment can provide a variety of natural language responses and, as a result, sound more human.

The following illustrates how example data identified by the search module 2304 can be transformed to an example natural language response by the NLG module 2306, which may be subsequently transmitted to an end user as bot-generated answer to an end user question.

The following table illustrates an example time series related data, which may be identified by the search module 2304 and provided to the NLG module 2306.

|  |  |  | 2010 | 2011 | 2012 | 2013 | 2014 |
|---|---|---|---|---|---|---|---|
| Thousand Barrels per Day | Production of Crude Oil including Lease Condensate | Nigeria | 2455.26 | 2550.35 | 2520.00 | 2367.37 | 2423.21 |

The following is an example natural language template that may be utilized by the NLG module 2306 to transform the example time series related data to a natural language response.

In {date} {indicator} for {region} was {value} {unit}. {indicator} in {region} {changeDirection} {changePercent} % from {prevValue} {unit} in {prevDate} to {value} {unit} in {date}. Since {trendStartValue} {trendName} in {trendStartDate}, {indicator} {trendDirection} {trendChangePercent} % in {date}.

In this example natural language response template: {date} variable represents the latest date for which the data is available; {indicator} variable represents the name of indicator found during intent matching; {region} variable represents the name of region found during intent matching; {value} variable represents the value of the indicator for the latest date available; {unit} variable represents the unit received with data from the search component; {prevDate} variable represents the second to last date for which the data is available; and {prevValue} variable represents the value corresponding to the {prevDate} variable. Using this example natural language response template and the example time series related data, the NLG module 2306 can generate the following example natural language response.

In 2014 Production of Crude Oil for Nigeria was 2,423.21 Thousand Barrels Per Day. Production of crude oil in Nigeria improved by 2.36% from 2,367.37 thousand barrels per day in 2013 to 2,423.21 thousand barrels per day in 2014. Since the 1.19% downward trend in 2012, production of crude oil went down by 3.84% in 2014.

According to some embodiments, rules for selecting a natural language response template are automatically learned by the NLG module 2306 based on provided examples, thereby obviating the need for manual creation of such rules (e.g., by an administrative user). In this way, the addition of new natural language response templates and their subsequent selection can be supported and simplified. More regarding this training is provided with respect to processed is described with respect with FIG. 27.

In the example method 2300, the conversation manager module 2308 tracks a context of a conversation with an end user (e.g., through a chat session established between the end user and a bot). The conversation manager module 2308 may enable an embodiment to track the context in which a natural language query (e.g., end user question) is posed by an end user, which can determine a natural language response to the natural language query. For instance, in an example conversation where an end user asks "Exports of Crude Oil" without specifying country, the context being tracked by the conversation manager module 2308 can be used to inter the country intended by the end user (e.g., "Nigeria" where the context indicates a previous question regarding Nigeria during the conversation). Information inferred from the context tracked by the conversation manager module 2308 can determine the set of structured intents identified by the NLP module 2302, the related data identified by the search module 2304, and the natural language response eventually produced by the NLG module 2306. In this way, the tracked context can be used to resolve ambiguity during structure intent matching by the NLP module 2302, identifying related data by the search module 2304, or both. The context being tracked by the conversation manager module 2308 can include a set of messages from an end user that determine the context of a conversation. The conversation manager module 2308 may change the context based on end user message that interpreted with a high degree of certainty.

Depending on the embodiments, the context tracked by the conversation manager module 2308 can infer (e.g., based on previous mentions) several concepts that may be missing from the natural language query. Examples concepts that may be inferred can include, without limitation, region, topic, indicator, named entity, and time interval.

Figure 25:
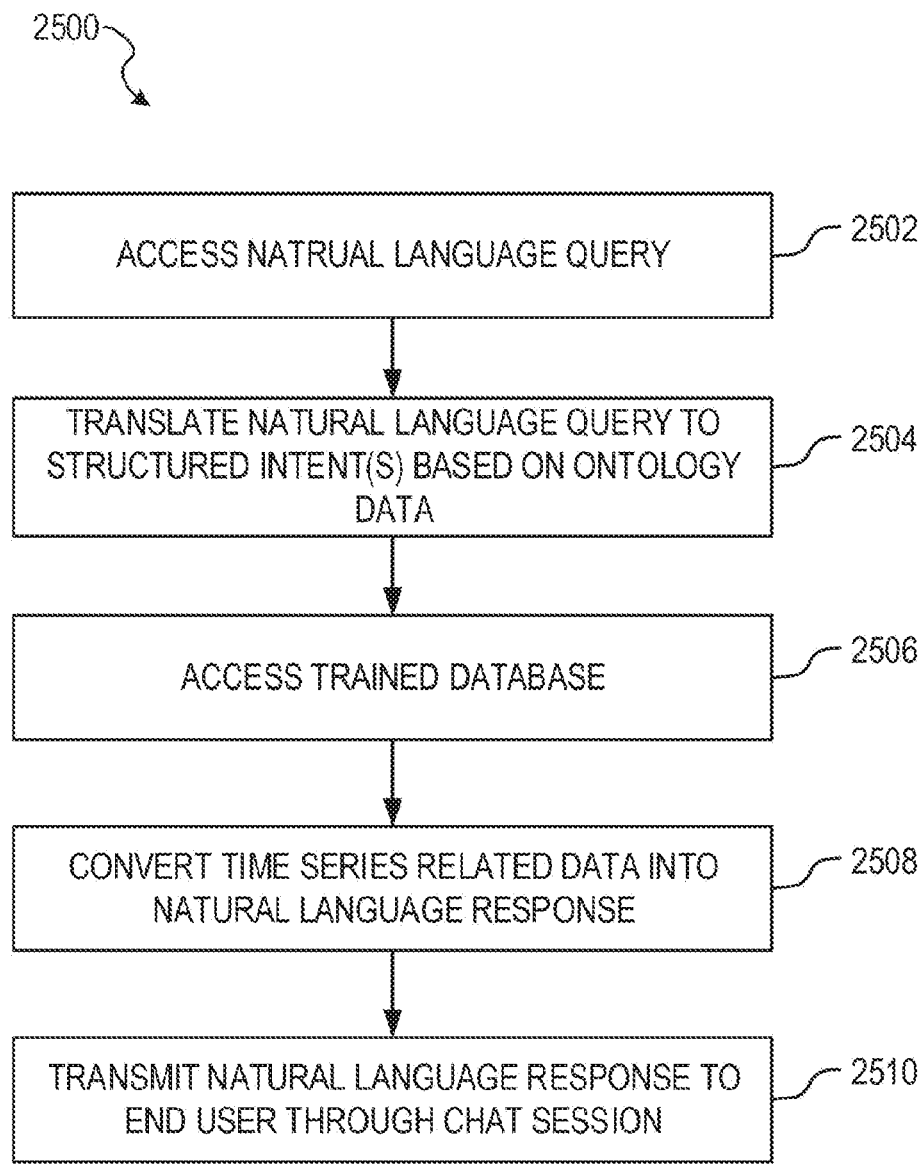
FIG. 25 is a flowchart of a method, in accordance with an example embodiment, for providing information in response to a natural language query.

FIG. 25 is a flowchart of a method 2500, in accordance with an example embodiment, for providing a natural language response to a natural language query. The method 2500 may be implemented on the hardware described herein and may incorporate and/or combine any one or more of the methodologies described herein.

As shown at operation 2502, for some embodiments, the method 2600 uses one or more hardware processors to access a natural language query from with an end user from a conversation between the end user and a bot). From operation 2502, the method 2600 proceeds to operation 2504. Accessing the natural language query may from the end user may comprise receiving the natural language query through a chat session established with a client device of the end user. For instance, the natural language query may be a question received by a bot from the end user. The conversation may be in the form of conversation data, which may be tracked and managed by a conversation manager.

As shown in operation 2504, for some embodiments, the method 2600 uses one or more hardware processors to translate the natural language query to a set of structured intents. From operation 2504, the method 2600 proceeds to operation 2506. The set of structured intents may represent high-level data requests relating to the natural language query accessed at operation 2502. Translating the natural language query to the set of structured intents may comprise matching the natural language query to an utterance template associated with at least one of the structured intents in the set of structured intents. Additionally, translating the natural language query to the set of structured intents may comprise resolving an ambiguity of the matching based on context data (e.g., provided by the conversation manager module 2308) determined from the conversation.

As described herein, an utterance template may comprise a query phrase having a sequence of words and delineated field. For some embodiments, the order in which words and delineated fields appear in the query phrase is relevant to an utterance template matching a natural language query. Each delineated field may be associated with a class (e.g., specify a class name or subclass name). The utterance template may match the natural language query if the words in the sequence fuzzy match corresponding words of the natural language query, and if associated classes of the delineated fields in the sequence include concepts named by corresponding words of the natural language query. With a fuzzy match, it is not necessary for the entire set of words to match to match corresponding words of the natural language query (i.e., some can be left unmatched).

As shown in operation 2506, for some embodiments, the method 2600 uses one or more hardware processors to access (e.g., using the database server(s) 124) a database trained with a machine learning algorithm (e.g., the database(s) 126) in order to identify time series related data associated with the set of structured intents identified by operation 2504. From operation 2506, the method 2600 proceeds to operation 2508. To identify the time series related data associated with the set of structured intents, an ambiguity may be resolved based on context data determined from the conversation. Such context data may be utilized to resolve an ambiguity with identifying a set of structured intents for the natural language query and, in turn, the resulting set of structured intents may be utilized to identify data related and relevant to the natural language query.

Additionally, to identify the time series related data associated with the set of structured intents, the accessing the database may comprise identifying a set of dimension members relevant to a set of concepts extracted from the natural query language based on the set of structured intents. Accessing the database may comprise identifying time series data relevant to the set of identified dimension members. Accessing the database may further comprise identifying the time series related data from the identified time series data based on a set of filter parameters.

As shown in operation 2508, for some embodiments, the method 2600 uses one or more hardware processors to convert the time series related data identified by operation 2506 into a natural language response. From operation 2508, the method 2600 proceeds to operation 2510. Converting the identified time series related data into the natural language response may comprise selecting a natural language response template based on a set of selection factors as described herein. The set of selection factors may include at least one selection factor that relates to the set of structured intents identified by operation 2504. Converting the identified time series related data into the natural language response may further comprise generating the natural language response by replacing a set of predefined variables in the selected natural language response template with data from the time series related data identified by operation 2506.

As shown in operation 2510, for some embodiments, the method 2600 uses one or more hardware processors to transmit the natural language response generated by operation 2508 to the end user through a chat session established with the client device of the end user.

Figure 26:
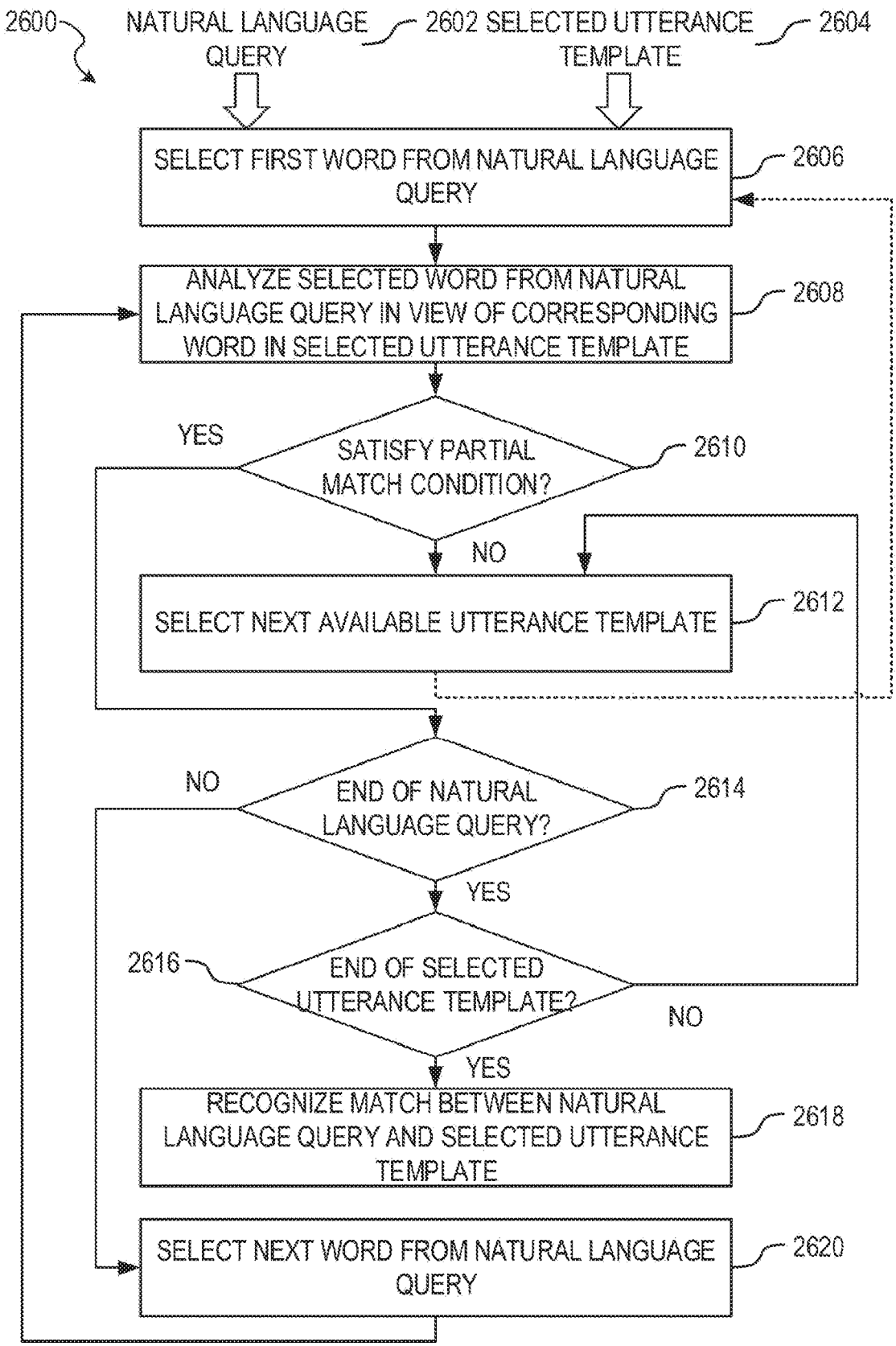
FIG. 26 is a flowchart of a method, in accordance with an example embodiment, for matching a natural language query to an utterance template associated with a structured intent.

FIG. 26 is a flowchart of a method 2600, in accordance with an example embodiment, for matching a natural language query 2602 to a selected utterance template 2604 associated with a structured intent. The method 2600 may he implemented on the hardware described herein and may incorporate and/or combine any one or more of the methodologies described herein. According to some embodiments, some or all of the method 2600 is utilized by the NLP module 2302 to identify a set of structured intents for a natural language query received by the NLP module 2302.

As shown in operation 2606, for some embodiments, the method 2600 uses one or more hardware processors to select a first word from the natural language query 2602. From operation 2606, the method 2600 proceeds to operation 2608.

As shown in operation 2608, for some embodiments, the method 2600 uses one or more hardware processors to analyze the selected word from the natural language query 2602 in view of a corresponding word in the selected utterance template 2604. From operation 2608, the method 2600 proceeds to decision 2610.

At decision 2610, if the method 2600 determines that the selected word satisfies a partial match condition in view of the corresponding word, the method 2600 proceeds to decision 2614. If not, the method 2600 proceeds to operation 2612.

As shown in operation 2612, for some embodiments, the method 2600 uses one or more hardware processors to select the next utterance template if one is available. At operation 2612, any partial match conditions satisfied are discarded. From operation 2612, the method 2600 returns to operation 2606.

At decision 2614, if the method 2600 determines that the end of the natural language query 2602 has been reached, the method 2600 proceeds to decision 2616. If not, the method 2600 proceeds to operation 2620.

At decision 2616, if the method 2600 determines that the end of the selected utterance template 2604 has been reached, the method 2600 proceeds to operation 2618. If not, the method 2600 returns to operation 2612.

As shown in operation 2618, for some embodiments, the method 2600 uses one or more hardware processors to recognize a match between the natural language query 2602 and the selected utterance template 2604.

As shown in operation 2620, for some embodiments, the method 2600 uses one or more hardware processors to select the next word from the natural language query 2602. From operation 2620, the method 2600 returns to operation 2608.

Figure 27:
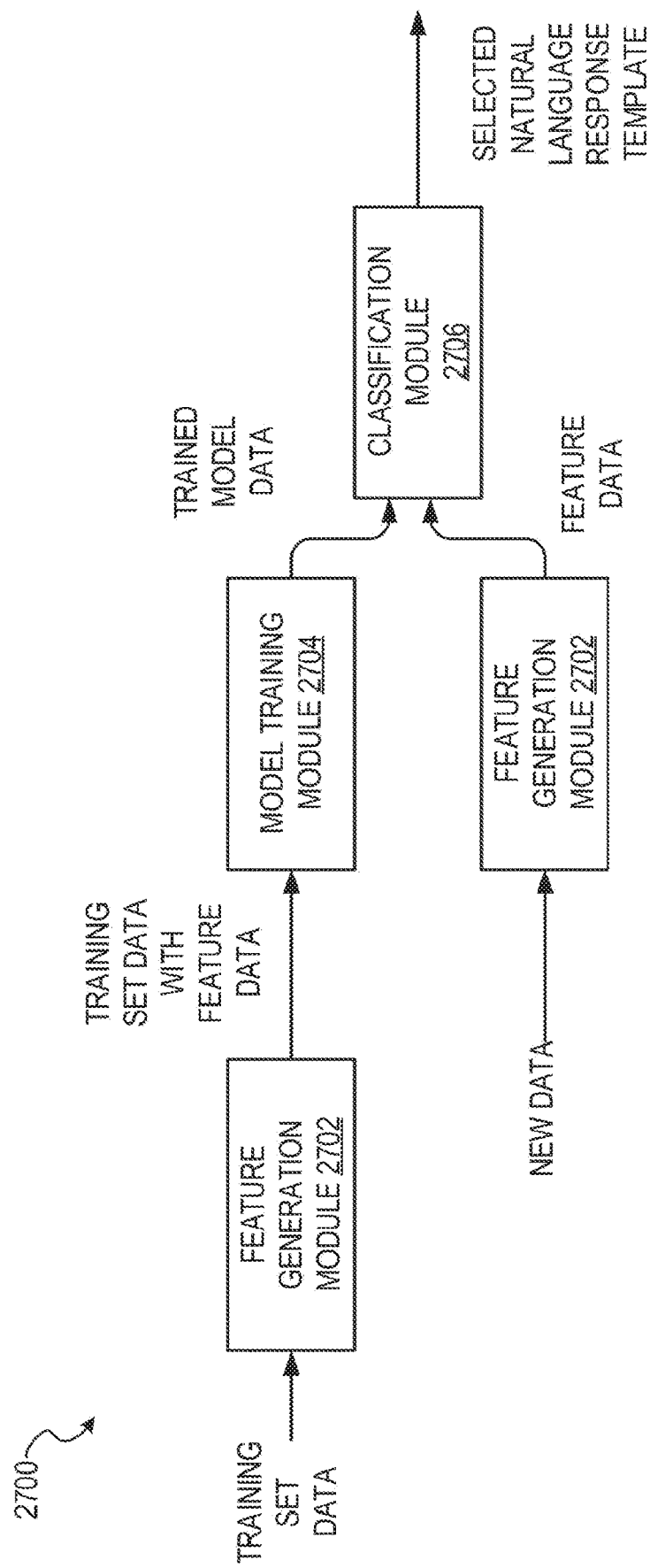
FIG. 27 is a flowchart of a method, in accordance with an example embodiment, for training natural language generation based on example matches between data and natural language response templates.

FIG. 27 is a flowchart of a method 2700, in accordance with an example embodiment, for training natural language generation based on example matches between data and natural language response templates. In particular, the method 2700 illustrates a process for training natural language generation (NLG) module (e.g., 2306) to generate rules for selecting a natural language response template for related data to be described (e.g., related data identified by search module 2304).

Figure 28:
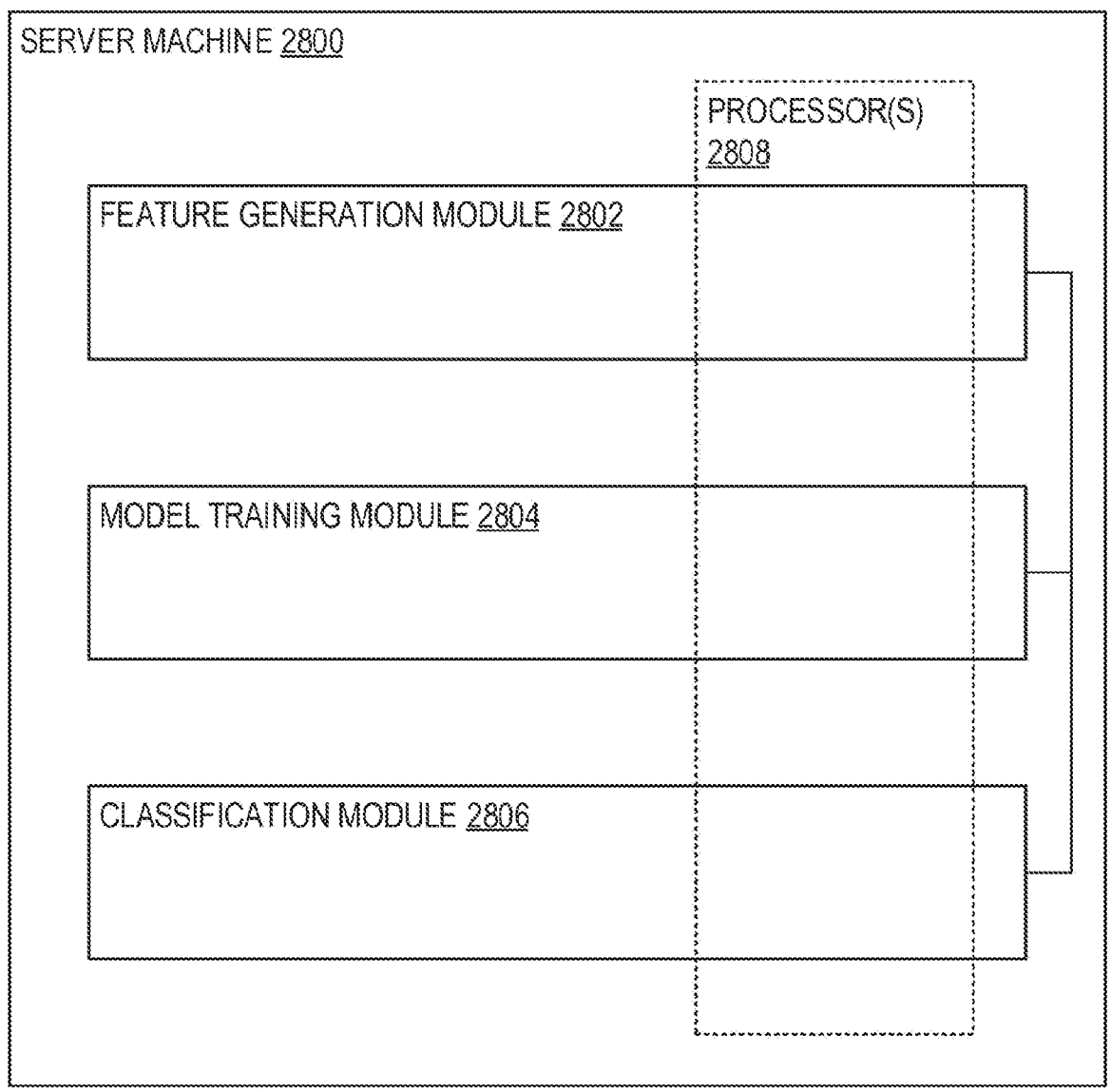
FIG. 28 is a block diagram illustrating components of a server machine, in accordance with an example embodiment, for training natural language generation based on example matches between data and natural language response templates.

The method 2700 may be implemented by one or more of the application server(s) 140 (see in FIG. 1) and, accordingly, is described merely by way of example with reference thereto. More particularly, example components of a server machine are shown in FIG. 28. The server machine 2800 is shown to include a feature generation module 2802, a model training module 2804, and a classification module 2806. The modules 2802-2806 may execute on one or more processors 2808. As method 2700 may be performed by the server machine 2800, it is described merely by way of example with reference thereto.

Returning to FIG. 27, the method 2700 is shown to include a feature generation module 2802, a model training module 2804, and a classification module 2806. In the example method 2700, the feature generation module 2802 receives training set data and produces training set data with feature data. The training set data can comprises a set of pairings between example data that needs to be described and an identifier of an example natural language response template that most appropriately describes the example data (e.g., according to some user). For each pairing in the training set data, the feature generation module 2802 can generate a set of features. Examples of features can include, without limitation: length of time series data; number of extremums in time series data; how well the time series data can be fitted by a straight line; a tilt angle of such line; how are the time series data can be fitted by an exponent; a parameter of the exponent with the best fit to the data; how well the time series data can be fitted by a parabola and its parameters; and how all the time series data can be fitted by a particular number of line segments and parameters of the segments.

The model training module 2704 receives the training set data with feature data, from the feature generation model 2702, and produces model data. The model training module 2704 may comprise a support vector machine (SVM) model, which the model training module 2704 trains using the training set data with feature data. For various embodiments, other types of classification models, such as neural networks, are utilized in addition to or in place of the SVM model. The trained model data produced by the model training module 2704 may be subsequently utilized by the classification module 2706 when selecting a natural language response template to describe particular data (e.g., related data identified by the search module 2304).

Eventually, when some new data not including the training set is to be described (e.g., related data identified by the search module 2304), a set of features for this new data is generated by the feature generation module 2702 in manner similar to the training set data described above. Based on trained model data from the model training module 2704 and feature data produced by the feature generation module 2702 for the new data, the classification module 2706 returns an identifier of a natural language response template well-suited to describe the new data.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of providing information in response to a natural language query, the method comprising:
    accessing, using one or more processors, the natural language query from an end user;
    translating, using the one or more processors, the natural language query to a set of structured intents based on ontology data by matching the natural language query to an utterance template that is associated with at least one structured intent in the set of structured intents, and the at least one structured intent comprising a set of different phrases that represent high-level requests for data related to the natural language query;
    accessing, using the one or more processors, a database trained with a machine learning algorithm to identify time series related data associated with the set of structured intents; and
    converting, using the one or more processors, the identified time series related data into a natural language response, the natural language response being responsive to the natural language query, the converting the identified time series related data into the natural language response comprising:
        selecting a natural language response template based on a set of selection factors,
    wherein at least one selection factor in the set of selection factors comprises at least one of:
        a structured intent in the set of structured intents;
        a class of an ontology;
        an observed trend in the identified time series related data; or
        a random number for selecting from a plurality of appropriate natural language response templates; and
    generating the natural language response based on the natural language response template by replacing a set of predefined variables in the selected natural language response template with data from the identified time series related data.

2. The method of claim 1, wherein the accessing the natural language query from the end user comprises receiving the natural language query through a chat session established with a client device of the end user.

3. The method of claim 1, comprising transmitting, using the one or more processors, the natural language response to the end user through a chat session established with a client device of the end user.

4. The method of claim 1, wherein from the ontology data, the utterance template comprises at least one of a class or a subclass for concepts.

5. The method of claim 4, wherein the utterance template comprises a query phrase having a sequence of words and delineated field, wherein each delineated field is associated with a class, and wherein the utterance template matches the natural language query if the words in the sequence textually match corresponding words of the natural language query and if associated classes of the delineated fields in the sequence include concepts named by corresponding words of the natural language query.

6. The method of claim 4, wherein the translating the natural language query to the set of structured intents comprises resolving an ambiguity of the matching based on context data determined from a conversation with the end user, and wherein the natural language query is from the conversation.

7. The method of claim 1, wherein to identify the time series related data associated with the set of structured intents, an ambiguity is resolved based on context data determined from a conversation with the end user, and wherein the natural language query is from the conversation.

8. The method of claim 1, wherein to identify the time series related data associated with the set of structured intents, the accessing the database comprises:
    identifying a set of dimension members relevant to a set of concepts extracted from the natural language query based on the set of structured intents;
    identifying time series data relevant to the set of identified dimension members; and
    identifying the time series related data from the identified time series data based on a set of filter parameters.

9. The method of claim 1, wherein the selecting the natural language response template based on the set of selection factors comprises selecting the natural language response template by a trained model, the trained model being trained on training set data including pairings between example data that needs to be described and an identifier of an example natural language response template that most appropriately describes the example data.

10. A computer system, comprising:
    one or more processors; and
    a memory comprising instructions which, when executed by the one or more processors, cause the one or more processors to perform operations comprising:
        accessing a natural language query from an end user;
        translating the natural language query to a set of structured intents based on ontology data by matching the natural language query to an utterance template that is associated with at least one structured intent in the set of structured intents, and the at least one structured intent comprising a set of different phrases that represent high-level requests for data related to the natural language query;
        accessing a database trained with a machine learning algorithm to identify time series related data associated with the set of structured intents; and
        converting the identified time series related data into a natural language response, the natural language response being responsive to the natural language query, the converting the identified time series related data into the natural language response comprising:

selecting a natural language response template based on a set of selection factors, wherein at least one selection factor in the set of selection comprises at least one of:
  a structured intent in the set of structured intents;
  a class of an ontology;
  an observed trend in the identified time series related data; or
  a random number for selecting from a plurality of appropriate natural language response templates; and
generating the natural language response based on the natural language response template by replacing a set of predefined variables in the selected natural language response template with data from the identified time series related data.

11. The computer system of claim 10, wherein the accessing the natural language query from the end user comprises receiving the natural language query through a chat session established with a client device of the end user.

12. The computer system of claim 10, wherein the instructions cause the one or more processors to perform operations comprising transmitting, using the one or more processors, the natural language response to the end user through a chat session established with a client device of the end user.

13. The computer system of claim 10, wherein from the ontology data, the utterance template comprises at least one of a class or a subclass for concepts.

14. The computer system of claim 13, wherein the utterance template comprises a query phrase having a sequence of words and delineated field, wherein each delineated field is associated with a class, and wherein the utterance template matches the natural language query if the words in the sequence textually fuzzy match corresponding words of the natural language query and if associated classes of the delineated fields in the sequence include concepts named by corresponding words of the natural language query.

15. The computer system of claim 13, wherein the translating the natural language query to the set of structured intents comprises resolving an ambiguity of the matching based on context data determined from a conversation with the end user, and wherein the natural language query is from the conversation.

16. The computer system of claim 10, wherein to identify the time series related data associated with the set of structured intents, an ambiguity is resolved based on context data determined from a conversation with the end user, and wherein the natural language query is from the conversation.

17. The computer system of claim 10, wherein to identify the time series related data associated with the set of structured intents, the accessing the database comprises:
  identifying a set of dimension members relevant to a set of concepts extracted from the natural language query based on the set of structured intents;
  identifying time series data relevant to the set of identified dimension members; and
  identifying the time series related data from the identified time series data based on a set of filter parameters.

18. The computer system of claim 10, wherein the selecting the natural language response template based on the set of selection factors comprises selecting the natural language response template by a trained model, the trained model being trained on training set data including pairings between example data that needs to be described and an identifier of an example natural language response template that most appropriately describes the example data.

19. A non-transitory machine-readable storage medium comprising instructions that, when executed by one or more processors of a machine, cause the machine to perform operations comprising:
  accessing a natural language query from an end user;
  translating the natural language query to a set of structured intents based on ontology data by matching the natural language query to an utterance template that is associated with at least one structured intent in the set of structured intents, and the at least one structured intent comprising a set of different phrases that represent high-level requests for data related to the natural language query;
  accessing a database trained with a machine learning algorithm to identify time series related data associated with the set of structured intents; and
  converting the identified time series related data into a natural language response, the natural language response being responsive to the natural language query, the converting the identified time series related data into the natural language response comprising:
    selecting a natural language response template based on a set of selection factors,
  wherein at least one selection factor in the set of selection factors comprises at least one of:
    a structured intent in the set of structured intents;
    a class of an ontology;
    an observed trend in the identified time series related data; or
    a random number for selecting from a plurality of appropriate natural language response templates; and
  generating the natural language response based on the natural language response template by replacing a set of predefined variables in the selected natural language response template with data from the identified time series related data.

20. The non-transitory machine-readable storage medium of claim 19, wherein the instructions cause the one or more processors to perform operations comprising transmitting the natural language response to the end user through a chat session established with a client device of the end user.

21. The non-transitory machine-readable storage medium of claim 19, wherein from the ontology data, the utterance template comprises at least one of a class or a subclass for concepts.

22. The non-transitory machine-readable storage medium of claim 21, wherein the utterance template comprises a query phrase having a sequence of words and delineated field, wherein each delineated field is associated with a class, and wherein the utterance template matches the natural language query if the words in the sequence textually match corresponding words of the natural language query and if associated classes of the delineated fields in the sequence include concepts named by corresponding words of the natural language query.

* * * * *